US012689788B2

(12) United States Patent
Choi et al.

(10) Patent No.: US 12,689,788 B2
(45) Date of Patent: Jul. 21, 2026

(54) CHEERING STICK CONTROL SYSTEM INCLUDING A CHEERING STICK CONTROL MESSAGE TRANSMITTER, A CHEERING STICK CONTROL MESSAGE TRANSMITTER, AND A CHEERING STICK CONTROL METHOD USING A CHEERING STICK CONTROL MESSAGE TRANSMITTER

(71) Applicant: HYBE Co., Ltd., Seoul (KR)

(72) Inventors: Bo Yoon Choi, Seoul (KR); Sung Joo Jeong, Seoul (KR); Hyeong Gu Kim, Seoul (KR); Da Hye Seo, Seoul (KR)

(73) Assignee: HYBE Co., Ltd., Seoul (KR)

( * ) Notice: Subject to any disclaimer, the term of this patent is extended or adjusted under 35 U.S.C. 154(b) by 0 days.

(21) Appl. No.: 18/345,722

(22) Filed: Jun. 30, 2023

(65) Prior Publication Data

US 2024/0007699 A1     Jan. 4, 2024

(30) Foreign Application Priority Data

Jul. 4, 2022     (KR) ........................ 10-2022-0081742

(51) Int. Cl.
| | |
|---|---|
| *H04N 21/422* | (2011.01) |
| *H04N 21/2187* | (2011.01) |
| *H04N 21/426* | (2011.01) |
| *H04N 21/431* | (2011.01) |
| *H04N 21/4788* | (2011.01) |
(Continued)

(52) U.S. Cl.
CPC ... *H04N 21/42222* (2013.01); *H04N 21/2187* (2013.01); *H04N 21/42221* (2013.01); *H04N 21/426* (2013.01); *H04N 21/4312* (2013.01);

*H04N 21/4788* (2013.01); *H05B 47/19* (2020.01); *H05B 47/1965* (2024.01);
(Continued)

(58) Field of Classification Search
CPC ....... H04N 21/42222; H04N 21/41265; H04N 21/2187; H04N 21/42221; H04N 21/426; H04N 21/4312
See application file for complete search history.

(56) References Cited

U.S. PATENT DOCUMENTS

2012/0258800 A1   10/2012   Mikhailov
2013/0013089 A1*   1/2013   Kawakami ......... H04N 21/8153
700/90
(Continued)

FOREIGN PATENT DOCUMENTS

KR   20-2016-0002619     7/2016
KR   10-1936822     1/2019
(Continued)

*Primary Examiner* — Pinkal R Chokshi
(74) *Attorney, Agent, or Firm* — STIP Law Group, LLC

(57) ABSTRACT

A cheering stick control method using a cheering stick control message transmitter according to an embodiment of the present disclosure, the method controlling a light emission pattern of a cheering stick through a cheering stick control message transmitter performed by at least one processor of a terminal, comprises linking to a cheering stick control message transmitter for data transmission and reception; receiving a performance video and a cheering stick control message corresponding to the performance video; and transmitting the received cheering stick control message to a cheering stick through the cheering stick control message transmitter.

14 Claims, 11 Drawing Sheets

(51) Int. Cl.
    *H05B 47/175*     (2020.01)
    *H05B 47/19*     (2020.01)
    *H04N 21/41*     (2011.01)

(52) U.S. Cl.
    CPC ...... *H04N 21/41265* (2020.08); *H05B 47/197*
        (2024.01); *H05B 47/1975* (2024.01)

(56)           References Cited

U.S. PATENT DOCUMENTS

| | | | |
|---|---|---|---|
| 2017/0032630 A1 | 2/2017 | Gervais et al. | |
| 2017/0048951 A1* | 2/2017 | Huang | H05B 47/19 |
| 2017/0249812 A1 | 8/2017 | Gervais et al. | |
| 2018/0049287 A1* | 2/2018 | Lu | H05B 47/155 |
| 2018/0352166 A1* | 12/2018 | Silic | H04N 23/66 |
| 2019/0088093 A1 | 3/2019 | Gervais et al. | |
| 2019/0394860 A1* | 12/2019 | Choi | H05B 47/1985 |
| 2020/0077474 A1* | 3/2020 | Chong | H05B 45/00 |
| 2021/0236944 A1* | 8/2021 | Summa | H04N 21/44008 |
| 2022/0124898 A1* | 4/2022 | Choi | F21V 33/00 |
| 2023/0009336 A1* | 1/2023 | Tang | H04N 21/234 |
| 2023/0062315 A1* | 3/2023 | Poynter | A63F 13/428 |
| 2023/0117158 A1 | 4/2023 | Choi | |
| 2023/0209119 A1* | 6/2023 | Jo | H04N 21/43615 |
| | | | 725/80 |
| 2024/0419261 A1* | 12/2024 | Oshiro | G06F 3/01 |

FOREIGN PATENT DOCUMENTS

| | | |
|---|---|---|
| KR | 10-1942809 | 1/2019 |
| KR | 10-2020-0047467 | 5/2020 |
| KR | 10-2021-0061120 | 5/2021 |
| KR | 10-2021-0126427 | 10/2021 |
| KR | 10-2021-0136814 | 11/2021 |
| KR | 2021136814 A * | 11/2021 |
| KR | 10-2022-0057502 | 5/2022 |
| WO | 2021/101269 | 5/2021 |

* cited by examiner

200

CHEERING STICK CONTROL SYSTEM INCLUDING A CHEERING STICK CONTROL MESSAGE TRANSMITTER, A CHEERING STICK CONTROL MESSAGE TRANSMITTER, AND A CHEERING STICK CONTROL METHOD USING A CHEERING STICK CONTROL MESSAGE TRANSMITTER

CROSS-REFERENCE TO RELATED APPLICATIONS

This application claims priority under 35 U.S.C. 119(a) to Korean Patent Application No. 10-2022-0081742, filed on Jul. 4, 2022, in the Korean Intellectual Property Office, the entire disclosure of which is incorporated herein by reference in its entirety.

TECHNICAL FIELD

The present disclosure relates to a cheering stick control message transmitter, a cheering stick control system including a cheering stick control message transmitter, and a cheering stick control method using a cheering stick control message transmitter. More particularly, the present disclosure relates to a cheering stick control message transmitter, a cheering stick control system including a cheering stick control message transmitter, and a cheering stick control method using a cheering stick control message transmitter, which perform a cheering performance suitable for a non-contact performance.

BACKGROUND

With the development of fandom culture, cheering sticks controlled by user terminals through Bluetooth communication have become ubiquitous. In particular, actual cheering sticks using LED lights are mainly used for offline fandom activities in places such as concerts and various other performance halls.

On the other hand, along with the recent spread of non-contact culture and the development of video platforms, online performances are becoming more popular; accordingly, technology development for cheering methods suitable for the online environment is being pursued.

For example, a method of displaying a virtual cheering stick on a display of a user terminal has been developed to show a preference for a star's performance video.

However, when trying to show their preference for the performance using the above method, users are not allowed to use an actual cheering stick even if they have one for their supported star; thus, a disadvantage of the above method is that a user has to purchase a virtual cheering stick separately and use the purchased virtual cheering stick on the user's terminal.

Moreover, even if each user uses an actual cheering stick in an online performance, practice is required to produce unified cheering, and it is, in fact, nearly impossible to harmonize colors and brightness for cheering.

In addition, even if a unified cheering performance is achieved, the network conditions vary depending on the region where each user is located; thus, there still exists a limit that the performer watching a video of fans cheering the performer may not feel the sense of unity.

SUMMARY

The present disclosure has been made to solve the problems in the prior art. The present disclosure intends to provide a cheering stick control message transmitter, a cheering stick control system including the cheering stick control message transmitter, and a cheering stick control method using the cheering stick control transmitter.

Also, the present disclosure intends to provide a cheering stick control message transmitter, a cheering stick control system including the cheering stick control message transmitter, and a cheering stick control method using the cheering stick control message transmitter, which enable a user to perform a cheering performance in a broadcasting way while watching an online performance at home.

Also, the present disclosure intends to provide a cheering stick control message transmitter receiving a control message back from a cheering stick, a cheering stick control system including the cheering stick control message transmitter, and a cheering stick control method using the cheering stick control message transmitter.

Also, the present disclosure intends to provide a cheering stick control message transmitter that does not require installing a separate driver, a cheering stick control system including the cheering stick control message transmitter, and a cheering stick control method using the cheering stick control message transmitter.

Also, the present disclosure intends to provide a cheering stick control message transmitter that adjusts a video output time and a control message output time, a cheering stick control system including the cheering stick control message transmitter, and a cheering stick control method using the cheering stick control message transmitter.

Technical objects to be achieved by the present disclosure and embodiments according to the present disclosure are not limited to the technical objects described above, and other technical objects may also be addressed.

A cheering stick control method using a cheering stick control message transmitter according to an embodiment of the present disclosure, the method controlling a light emission pattern of a cheering stick through a cheering stick control message transmitter performed by at least one processor of a terminal, comprises linking to a cheering stick control message transmitter for data transmission and reception; receiving a performance video and a cheering stick control message corresponding to the performance video; and transmitting the received cheering stick control message to a cheering stick through the cheering stick control message transmitter.

Here, the cheering stick control message includes at least one or more control signals of a light emission pattern control signal for controlling the light emission, color, brightness, and light emission effect of an LED included in the cheering stick; and a vibration pattern control signal for controlling the operation, vibration intensity, and a vibration pattern of a vibration sensor included in the cheering stick.

Also, the cheering stick control message includes command data that activates cheering preparatory data prestored in the cheering stick.

Also, the cheering stick control message transmitter includes a control message transmitting unit that transmits an RF signal obtained by converting a cheering stick control message into a signal in a neighboring, unspecified predetermined frequency band through a broadcasting method.

The cheering stick control message transmitter includes a control message receiving unit that receives a second RF signal including user input information for the cheering stick from nearby cheering sticks.

Also, a cheering stick control method using a cheering stick control message transmitter according to an embodiment of the present disclosure further includes receiving user input information received by the control message receiving unit from the cheering stick control message transmitter and displaying feedback content on the performance video or on a cheering message window linked to the performance video based on the user input information.

Also, the receiving the cheering stick control message corresponding to the performance video selected by the user input includes any one of obtaining at least one or more cheering stick control messages previously matched to the performance video and obtaining a cheering stick control message corresponding to the performance video from a streaming server in conjunction with the streaming server.

Also, the adjusting the time synchronization of the received cheering stick control message includes detecting a start point of a control signal included in the obtained performance video and setting a control signal transmission point after a predetermined time from the detected control signal start point.

Also, the transmitting the cheering stick control message with the adjusted time synchronization includes recognizing the cheering stick control message transmitter linked to the terminal and transmitting the cheering stick control message with the adjusted time synchronization through the recognized cheering stick control message transmitter in a broadcasting way.

Also, a cheering stick control message transmitter according to an embodiment of the present disclosure comprises a control message receiving unit linked to a terminal transmitting a performance video for data transmission and reception; a control message transmitting unit transmitting a cheering stick control message received from the terminal; and a controller remotely controlling light emission of a cheering stick by controlling the control message receiving unit and the control message transmitting unit, wherein the controller transmits the cheering stick control message to unspecified cheering sticks in a broadcasting way by controlling the control message transmitting unit.

Meanwhile, a cheering stick control system through a cheering stick control message transmitter according to an embodiment of the present disclosure comprises at least one or more cheering sticks; a cheering stick control message transmitter; and a terminal including at least one or more displays displaying a performance video, at least one or more memories, and at least one or more processors, wherein at least one streaming program being executed by the processor and providing a cheering stick control system is stored in the memory of the terminal; and the at least one streaming program is linked to the cheering stick control message transmitter, receives the performance video and a cheering stick control message corresponding to the performance video, and transmits the received cheering stick control message to a cheering stick through the cheering stick control message transmitter.

Also, the streaming program detects at least one or more user inputs based on the cheering stick through the cheering stick control message transmitter and controls feedback content to be displayed on the performance video based on the detected user input.

Also, the at least one or more user inputs based on the cheering stick include an input of pressing a button included in the cheering stick or an input of shaking the cheering stick.

Also, the streaming program receives at least one or more pieces of information among a serial number of a cheering stick, artist information matched to the cheering stick, and a cheering stick image representing the shape of the cheering stick from the cheering stick through the cheering stick control message transmitter together with the user input.

Also, the feedback content is output based on at least one of text, image, and video information from at least one or more of a cheering stick image, the number of times a button of the cheering stick is pressed, the number of times the cheering stick is shaken, and a cheering stick effect.

A cheering stick control message transmitter, a cheering stick control system including the cheering stick control message transmitter, and a cheering stick control method using the cheering stick control message transmitter according to an embodiment of the present disclosure overcome low transmission speed, short transmission range, and low data capacity transmission rate, which are the disadvantages of Bluetooth Low Energy (BLE) technology, by using a broadcasting way, thereby saving the time required for pairing, which has to be performed for each cheering stick, and increasing the speed of data transmission.

Also, a cheering stick control message transmitter, a cheering stick control system including the cheering stick control message transmitter, and a cheering stick control method using the cheering stick control message transmitter according to an embodiment of the present disclosure receive a control message back from a cheering stick, thereby relieving the boredom of a user who watches a performance according to one-way signal transmission, generating the atmosphere of an actual performance hall in which an artist and the audience communicate interactively, and improving the satisfaction of a user who enjoys a non-contact performance.

Also, a cheering stick control message transmitter, a cheering stick control system including the cheering stick control message transmitter, and a cheering stick control method using the cheering stick control message transmitter according to an embodiment of the present disclosure do not require installing a separate driver and allow a user to receive the same signal as transmitted from a performance venue at home only by simply connecting a USB-type transmitter to the user's terminal, thereby improving the user's convenience and increasing the sense of presence of an online performance.

Also, a cheering stick control message transmitter, a cheering stick control system including the cheering stick control message transmitter, and a cheering stick control method using the cheering stick control message transmitter according to an embodiment of the present disclosure simultaneously transmit a message controlling a cheering stick and charge the cheering stick based on a cradle-type transmitter, thereby obviating the need for a user to have a separate device or time for charging a cheering stick and increasing efficiency for the user in managing the cheering stick.

Also, a cheering stick control message transmitter, a cheering stick control system including the cheering stick control message transmitter, and a cheering stick control method using the cheering stick control message transmitter according to an embodiment of the present disclosure control a cheering stick to emit light or generate vibration according to an artist's song even for a performance video broadcast online, thereby improving the satisfaction of the audience enjoying the online performance.

Also, a cheering stick control message transmitter, a cheering stick control system including the cheering stick control message transmitter, and a cheering stick control method using the cheering stick control message transmitter according to an embodiment of the present disclosure simultaneously control cheering sticks even if playback timing of a video displayed through a display differs due to network conditions, thereby performing consistent control of a cheering stick without being influenced by the user's location.

The technical effects of the present disclosure are not limited to the technical effects described above, and other technical effects not mentioned herein may be understood from the description below.

DETAILED DESCRIPTION

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the specification, the same or corresponding constituting element is assigned the same reference number, and repeated descriptions thereof will be omitted.

Figure 1:
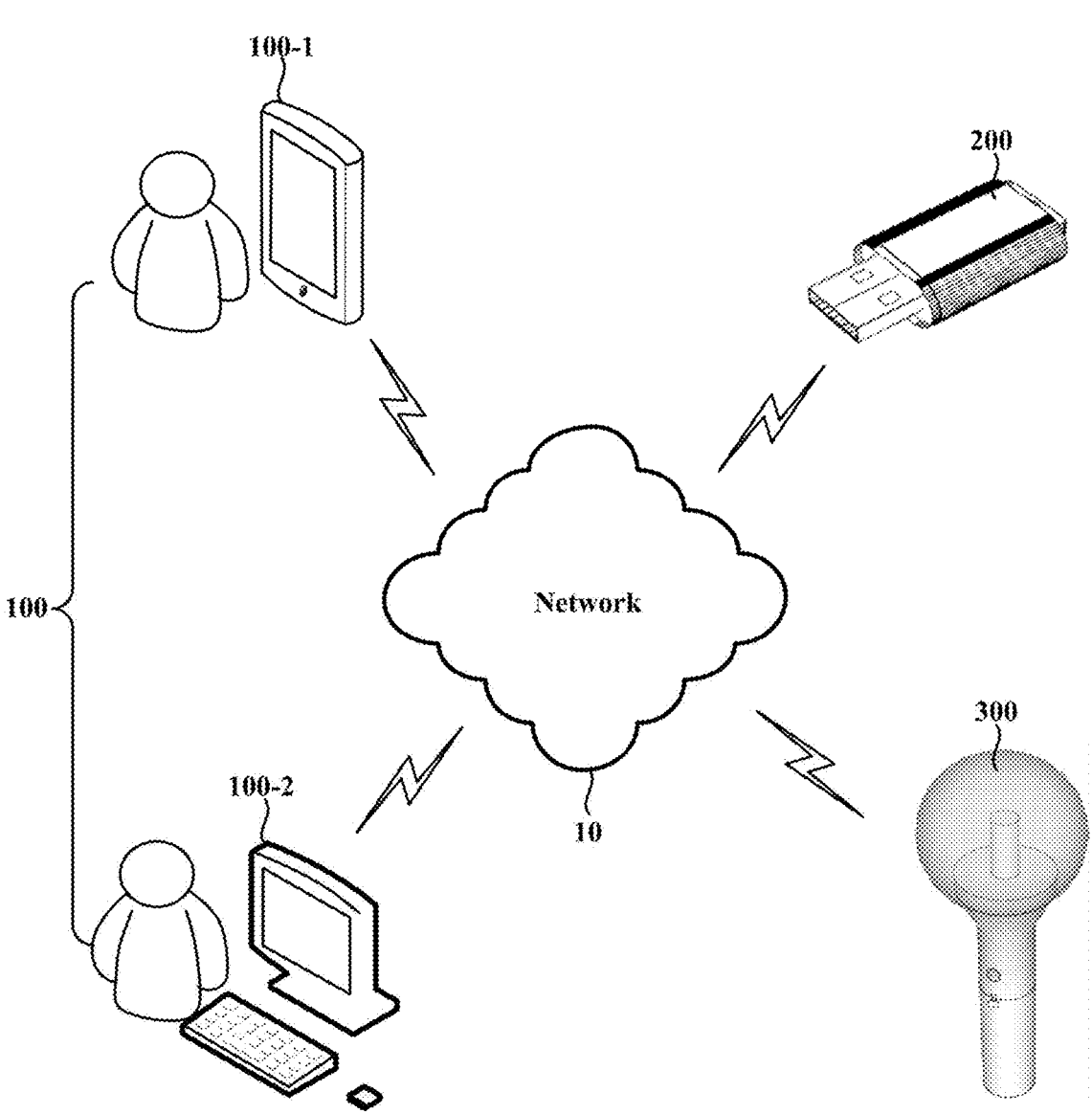
FIG. 1 illustrates a conceptual diagram of a system providing a cheering stick control service including a cheering stick control message transmitter according to an embodiment of the present disclosure.

FIG. 1 illustrates a conceptual diagram of a system providing a cheering stick control service including a cheering stick control message transmitter according to an embodiment of the present disclosure.

Referring to FIG. 1, a system providing a cheering stick control service including a cheering stick control message transmitter according to an embodiment of the present disclosure may provide a cheering stick control service for controlling light emission of a cheering stick to perform a cheering performance suitable for a performance conducted in real-time, even at a remote place.

For example, the cheering stick control message may include a signal including light emission data for controlling the light emission (e.g., turning on or off), color, brightness, and light emission effect of an LED included in the cheering stick and/or a signal for controlling the operation (e.g., turning on or off), vibration intensity, and a vibration pattern of a vibration sensor included in the cheering stick.

In the embodiment, the cheering stick control message may be an activation signal for operating the cheering stick based on light emission pattern data pre-stored in the cheering stick.

Also, in the embodiment, the system for providing a cheering stick control service including the cheering stick control message transmitter described above includes a terminal 100, a cheering stick control message transmitter 200, a cheering stick 300, and a network 10.

Here, the terminal 100, the cheering stick control message transmitter 200, and the cheering stick 300 may be connected to each other through the network 10.

Here, the network 10 according to the embodiment refers to a connection structure in which individual nodes such as the terminal 100, the cheering stick control message transmitter 200, and/or the cheering stick 300 may exchange information with each other; one example of the network 10 may include, but is not limited to, a 3rd Generation Partnership Project (3GPP) network, a Long Term Evolution (LTE) network, a World Interoperability for Microwave Access (WiMAX) network, the Internet, a Local Area Network (LAN), a Wireless Local Area Network (LAN), a Wide Area Network (WAN), a Personal Area Network (PAN), a Bluetooth network, a satellite broadcasting network, an analog broadcasting network, and a Digital Multimedia Broadcasting (DMB) network.

In what follows, the terminal 100, the cheering stick control message transmitter 200, and the cheering stick 300 implementing the system providing a cheering stick control service will be described in detail with reference to appended drawings.

Terminal 100

The terminal 100 according to an embodiment of the present disclosure may be a predetermined computing device installed with a streaming program 111 that provides a cheering stick control service in conjunction with an online performance.

Specifically, from the hardware point of view, the terminal 100 may include a mobile-type computing device 100-1 and/or a desktop-type computing device 100-2 installed with the streaming program 111.

Here, the mobile-type computing device 100-1 may be a mobile device such as a smartphone or a tablet PC installed with an application including the streaming program 111.

For example, the mobile-type computing device 100-1 may include a smartphone, a mobile phone, a digital broadcast terminal, a personal digital assistant (PDA), a portable multimedia player (PMP), and a tablet PC.

Also, the desktop-type computing device 100-2 may include a device installed with a program for executing a cheering stick control service through wired/wireless communication, such as a personal computer including a fixed desktop PC, a laptop computer, or an ultrabook installed with the streaming program 111.

Also, according to an embodiment, the terminal 100 may further include a predetermined server computing device that provides a cheering stick control service environment.

In what follows, for the convenience of description, it is assumed that the terminal 100 is implemented by the desktop-type computing device 100-2.

Figure 2:
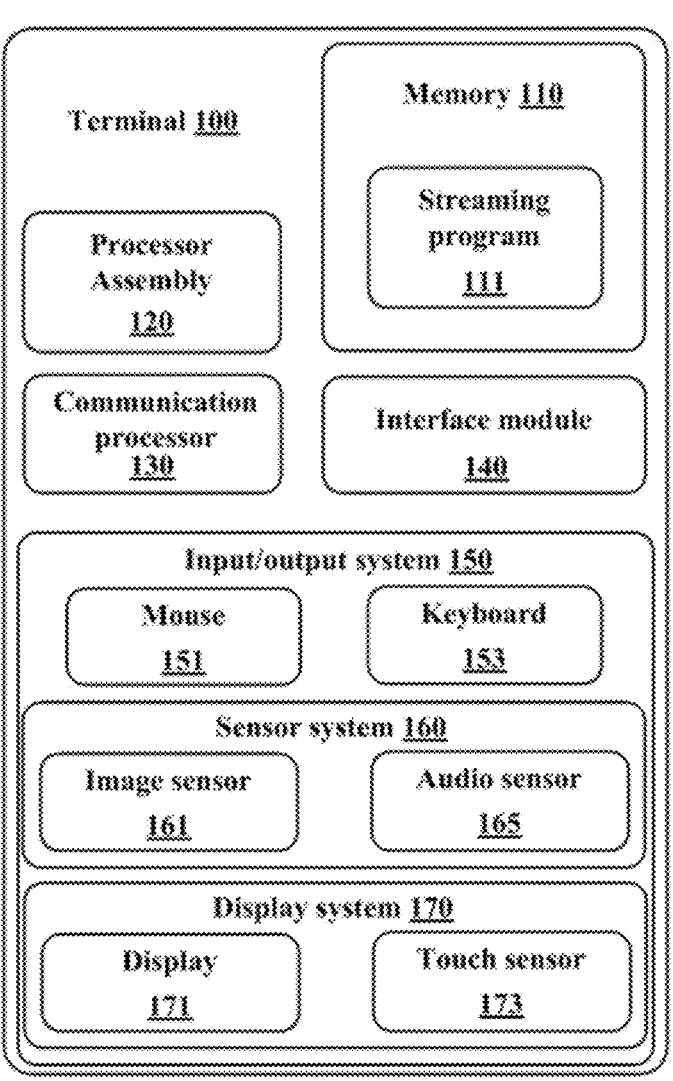
FIG. 2 is an internal block diagram of a terminal according to an embodiment of the present disclosure.

FIG. 2 is an internal block diagram of a terminal according to an embodiment of the present disclosure.

Referring to FIG. 2, from a functional point of view, the terminal 100 may include a memory 110, a processor assembly 120, a communication processor 130, an interface module 140, an input/output system 150, a sensor system 160, and a display system 170. The constituting elements may be disposed to be included within a housing.

Specifically, a streaming program 111 is stored in the memory 110, and the streaming program 111 may have any one or more of various application programs, data, and commands for providing online performance streaming and a cheering stick control service environment.

In other words, the memory 110 may store commands and data that may be used to create a cheering stick control service environment.

Also, the memory 110 may include a program area and a data area.

Here, the program area according to the embodiment may be linked between an Operating System (OS) and functional elements for booting the terminal 100, and the data area may store the data generated according to the use of the terminal 100.

Also, the memory 110 may include at least one or more non-volatile computer-readable storage media and volatile computer-readable storage media.

For example, the memory 110 may be one of various storage devices, such as a ROM, an EPROM, a flash drive, and a hard drive; and may include a web storage performing a storage function of the memory 110 on the Internet.

The processor assembly 120 may include at least one or more processors capable of executing instructions of the streaming program 111 stored in the memory 110 to perform online performance streaming and various tasks for creating a cheering stick control service environment.

In the embodiment, the processor assembly 120 may control the overall operation of the constituting elements through the streaming program 111 of the memory 110 to provide online performance streaming and a cheering stick control service.

The processor assembly 120 may be a system-on-a-chip (SOC) suitable for the terminal 100, including a central processing unit (CPU) and/or a graphics processing unit (GPU), execute the operating system (OS) and/or an application program stored in the memory 110, and control the individual constituting elements installed in the terminal 100.

Also, the processor assembly 120 may communicate with each constituting element internally through a system bus and may include one or more predetermined bus structures including a local bus.

Also, the processor assembly 120 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

The communication processor 130 may include one or more devices for communicating with an external device. The communication processor 130 may communicate with the external device through a wireless or wired network.

Specifically, the communication processor 130 may communicate with another terminal and a server that store a content source for implementing a cheering stick control service environment and communicate with various user input components, such as a controller that receives a user input.

In the embodiment, the communication processor 130 may transmit and receive various data related to online performance streaming and the cheering stick control service to and from another terminal and/or an external server.

The communication processor 130 may transmit and receive data wirelessly to and from at least one of a base station, an external terminal, and an arbitrary server on a mobile communication network built through a communication device capable of performing technology standards or communication methods (for example, Long Term Evolution (LTE), Long Term Evolution-Advanced (LTE-A), 5G New Radio (NR), and WiFi) for mobile communication.

The interface module 140 may connect the terminal 100 communicatively with one or more other devices. Specifically, the interface module 140 may include a wired and/or wireless communication device compatible with one or more different communication protocols.

Through the interface module 140, the terminal 100 may be connected to various input/output devices.

For example, the interface module 140 may be connected to an audio output device such as a headset port or a speaker to output audio.

For example, although the description assumes that the audio output device is connected through the interface module 140, an embodiment in which the audio output device is installed inside the terminal 100 is also possible.

Also, for example, the interface module 140 may be connected to an input device such as a keyboard and/or a mouse to obtain user input.

Also, in the embodiment, the interface module 140 may be connected to a dongle device (e.g., a USB flash drive) including the cheering stick control message transmitter 200 to transmit a predetermined control message.

This interface unit 140 may be implemented by using at least one of a wired/wireless headset port, an external charging port, a wired/wireless data port, a memory card port, a port connecting to a device equipped with an identification module, an audio Input/Output (I/O) port, a video Input/Output (I/O) port, an earphone port, a power amplifier, an RF circuit, a transceiver, and other communication circuits.

The input/output system 150 may detect a user's input (e.g., a gesture, a voice command, actuation of a button, or other types of inputs) related to a cheering stick control service.

To this end, the input/output system 150 may include a sensor system 160 and a display system 170.

Specifically, the input/output system 150 may be connected to an external controller through the interface unit 140 to receive a user's input.

Also, the input/output system 150 may be connected to an external controller through the interface module 140 to receive a user's input.

Also, the input/output system 150 may receive a user input (e.g., a touch input, a mouse input, a keyboard input, a gesture input, and a motion input using a guide tool).

For example, the terminal 100 may connect the input/output system 150 to at least one device such as a mouse 151, a keyboard 153, a gesture input controller, an image sensor (e.g., a camera), and an audio sensor according to various communication protocols to obtain user input.

Also, the terminal 100 may be connected to an external output device through the input/output system 150; for example, the terminal 100 may be connected to the display system 170 or an audio output system to output predetermined data.

The sensor system 160 may include various sensors such as an image sensor 161, an audio sensor 165, a position sensor, a distance sensor, a proximity sensor, and a contact sensor.

Here, the image sensor 161 may capture an image and/or a video of the physical space around the terminal 100.

In the embodiment, the image sensor 161 may obtain an image related to a cheering stick control service (e.g., a user image).

Also, the image sensor 161 may be disposed on the front or/and rear surface of the terminal 100 to obtain an image by photographing the scene in the deposition direction and may capture the physical space through a camera disposed toward the outside of the terminal 100.

The image sensor 161 may include an image sensor device and an image processing module. Specifically, the image sensor 161 may process a still image or a moving image obtained by an image sensor device (e.g., CMOS or CCD).

Also, the image sensor 161 may process a still image or a moving image obtained through the image sensor device using an image processing module to extract necessary information and transmit the extracted information to the processor.

The image sensor 161 may be a camera assembly including at least one or more cameras. The camera assembly may include a general camera for photographing in the visible light band and may further include a special camera such as an infrared camera or a stereo camera.

Also, the image sensor 161 as described above may be operated by being included in the terminal 100 according to an embodiment or by being included in an external device (e.g., an external server) through interworking based on the communication processor 130 and/or the interface module 140.

The audio sensor 165 may recognize a sound in the surroundings of the terminal 100.

Specifically, the audio sensor 165 may include a microphone capable of detecting a voice input of a user that uses the terminal 100.

In the embodiment, the audio sensor 165 may receive voice data required for a cheering stick control service from the user.

The display system 170 may output various information related to online performance streaming and a cheering stick control service as a graphic image.

For example, the display system 170 may display online performance streaming including a real-time, online performance video and chatting of fans attending the performance.

Also, the display system 170 may display a user interface (UI) for online performance settings and cheering stick control, content, and/or Content Management System (CMS)-based data.

The display system 170 may be implemented using at least one of a liquid crystal display (LCD), a thin film transistor-liquid crystal display (TFT LCD), an organic light-emitting diode (OLED), a flexible display, a three-dimensional (3D) display, and an electronic ink (e-ink) display.

The constituting elements above may be disposed within the housing of the terminal 100, and the user interface may include a touch sensor 173 on the display 171 configured to receive a user touch input.

Specifically, the display system 170 may include a display 171 that outputs an image and a touch sensor 173 that detects a user's touch input.

For example, the display 171 may be implemented as a touch screen by forming a layer structure or by being integrated with the touch sensor 173. The touch screen may not only function as a user input unit providing an input interface between the terminal 100 and the user but also provide an output interface between the terminal 100 and the user.

Also, in the embodiment, the terminal 100 may further include a cheering stick controller for directly transmitting a control message to the cheering stick 300 without involving the cheering stick control message transmitter 200.

Also, in the embodiment, the terminal 100 may output a streaming video received from an external server to the display 171 based on the streaming program 111.

Also, in the embodiment, the terminal 100 may transmit a cheering stick control message matched to a predetermined display point on the received streaming video to the cheering stick control message transmitter 200.

Also, in the embodiment, the terminal 100 may receive a control message from the cheering stick control message transmitter 200.

Also, in the embodiment, the terminal 100 may display a predetermined mark (e.g., a heart symbol) on the streaming video being output to the display 171 based on the received control message. Also, in the embodiment, the terminal 100 may display a predetermined mark on a support message window or a support area linked to the streaming video being output to the display 171 based on the received control message.

The terminal 100 may further perform at least part of the functional operations performed by the cheering stick control message transmitter 200 to be described later.

Cheering Stick Control Message Transmitter 200

The cheering stick control message transmitter 200 according to an embodiment of the present disclosure may be a computing device that receives a control message from a streaming program 111 providing a cheering stick control service and delivers the received control message to a cheering stick.

Specifically, a cheering stick control message transmitter 200 according to the embodiment may be connected to the terminal 100 based on the interface module 140 and may transmit a cheering stick control message through the interface module 140 from a streaming program 111 installed in the terminal 100.

In one embodiment, the cheering stick control message transmitter 200 may be a dongle device that is physically mounted on a port of the interface module 140 of the terminal 100 and receives data in a wired communication method.

A dongle device refers to a small-sized hardware component connected to a computer, for example, a portable device such as a USB flash drive connected to a USB port. The dongle device provides the advantage that it is easy to be mounted on the terminal 100 and easy to carry to be quickly installed in the terminal 100 performing online streaming, thereby enabling the implementation of a cheering stick control process.

In the embodiment of the present disclosure, it is assumed that the cheering stick control message transmitter 200 is implemented as a dongle device, but the cheering stick control message transmitter 200 may be implemented in any form as long as it operates in conjunction with the terminal 100 in a wired or wireless manner. In other words, in one embodiment, the cheering stick control message transmitter 200 may be linked to the terminal for data transmission and reception by being mounted on a port of the terminal 100 along with a connector capable of physical wired communication.

In another embodiment, the transmitter 200 may be connected to the terminal 100 through a short-range communication method (e.g., Bluetooth) to transmit and receive data related to the cheering stick 300 to and from the terminal 100. In other words, in another embodiment, the cheering stick control message transmitter 200 may be linked to enable data transmission and reception to and from the terminal 100 by performing pairing for data transmission and reception using a preset wireless communication protocol.

Figure 3:
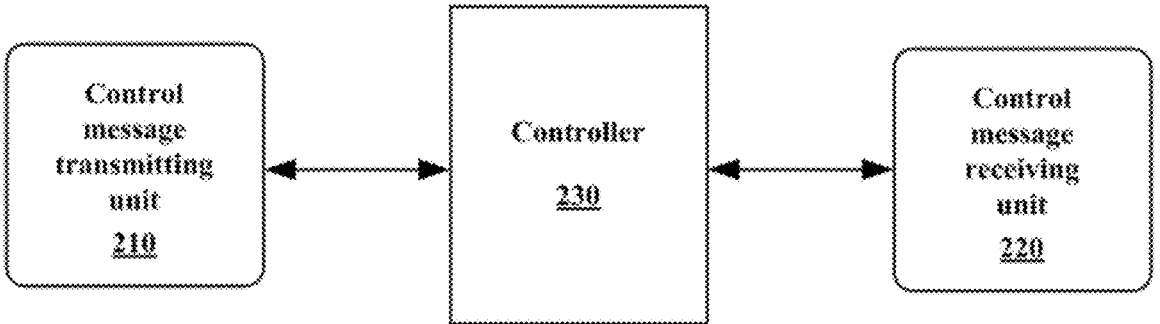
FIG. 3 is an internal block diagram of a cheering stick control message transmitter according to an embodiment of the present disclosure.

FIG. 3 is an internal block diagram of a cheering stick control message transmitter according to an embodiment of the present disclosure.

Referring to FIG. 3, the cheering stick control message transmitter 200 (in what follows, the transmitter 200) may include a control message transmitting unit 210, a control message receiving unit 220, and a controller 230. The constituting elements may be disposed to be included within a housing of the transmitter 200.

Specifically, the control message transmitting unit 210 may include one or more devices for communicating with the terminal 100.

Also, the control message transmitting unit 210 may communication with other terminals to implement an environment for cheering stick control message communication.

In the embodiment, the control message transmitting unit 210 may transmit and receive various data related to cheering stick control message communication (e.g., control messages) to and from other terminals and/or an external server.

The control message transmitting unit 210 may transmit and receive data wirelessly to and from at least one of a base station, an external terminal, and an arbitrary server on a mobile communication network built through a communication device capable of performing technology standards or communication methods (for example, Long Term Evolution (LTE), Long Term Evolution-Advanced (LTE-A), 5G New Radio (NR), and WiFi) for mobile communication or short-range communication methods.

Also, in the embodiment, the control message transmitting unit 210 may transmit information based on the short-range communication method.

To this end, the control message transmitting unit 210 according to the embodiment may include a wireless communication module for short-range communication (e.g., at least one of an NFC module, an RF transceiver, a Zigbee module, a Bluetooth module, and WiFi module).

Also, in the embodiment, the control message transmitting unit 210 may transmit a control message transmitted from the terminal 100 to at least one or more other devices (in the embodiment, the cheering stick 300) through a one-to-many scheme.

For example, the control message transmitting unit 210 may transmit a control message to at least one or more cheering sticks 300 through a broadcasting way (an all-to-all communication scheme in which traffic is delivered to an unspecified number of people without specifying a recipient).

Specifically, the control message transmitting unit 210 may transmit a control message to nearby cheering sticks using a preset broadcasting protocol, the nearby cheering sticks configured to receive a broadcast signal compliant with a preset broadcasting protocol may receive the transmitted control message, and the cheering sticks may operate according to the received control message.

Here, the preset broadcasting protocol may specify a frequency band, a control message encoding/decoding method, and the like. The control message transmitting unit 210 may include a broadcast transmitter.

The broadcast transmitter may include an exciter composed of an oscillator and a modulator; modulate a control message received from the terminal 100 into radio waves of a predetermined frequency band according to a preset broadcasting protocol; and transmit the RF signal through an antenna.

The control message transmitting unit 210 may overcome low transmission speed, short transmission range, low data capacity transmission rate, and excessive power consumption, which are the disadvantages of Bluetooth Low Energy (BLE) technology, and easily control a plurality of cheering sticks, save the time required for pairing, which has to be performed by a user for each cheering stick and the cheering stick control message transmitter 200, and increase the speed of data transmission by using a broadcasting way.

Meanwhile, the control message receiving unit 220 may include a first control message receiving unit that receives a control message from the terminal 100. Also, the control message receiving unit 220 may include a second control message receiving unit that receives user input from the cheering stick 300.

The control message receiving unit 220 may include one or more devices for communicating with the terminal 100 like the control message transmitting unit 210; thus, the descriptions on the control message transmitting unit 210 will be applied with necessary changes made, and what differs from the descriptions already given above will be mainly described.

The first control message receiving unit may receive a control message in a wired method through the interface module 140 of the terminal 100 and may receive a control message in a wireless method through the communication processor 130.

In the embodiment, the first control message receiving unit may be a dongle device including a connector coupled to a physical port of the interface module 140 and receiving a control message in a wired communication method through the connector.

Also, in the embodiment, the second control message receiving unit may receive information based on a short-range communication method from at least one or more cheering sticks 300.

Specifically, in the embodiment, the second control message receiving unit may receive a control message generated by the user manipulating the cheering stick 300 from the cheering stick 300.

At this time, since a plurality of users and cheering sticks 300 may be located around one transmitter 200, the second control message receiving unit may receive at least one or more control messages.

For example, the second control message receiving unit may receive a control message generated by the user performing an action of pressing a button included in the cheering stick 300 or performing a motion of shaking the cheering stick 300.

In the embodiment, the second control message receiving unit relieves the boredom of a user who simply watches a performance according to one-way signal transmission, and improves the satisfaction of a user who enjoys a non-contact performance by directing the atmosphere of an actual performance hall in which an artist and the audience communicate interactively, by receiving a control message back from a cheering stick.

To perform various tasks for generating a cheering stick control service environment, the controller 230 may include at least one or more processors capable of executing commands for transmitting and receiving at least one or more cheering stick control messages.

In the embodiment, the controller 230 may control the overall operation of the constituting elements of the transmitter 200 to provide a cheering stick control service. Regarding the implementation of the controller 230, the detailed descriptions given above for the processor assembly 120 of the terminal 100 will be applied with necessary changes made.

From the hardware point of view, the transmitter 200 including the plurality of configurations above may be implemented in the form of a removable drive or cradle-type device.

Figure 4:
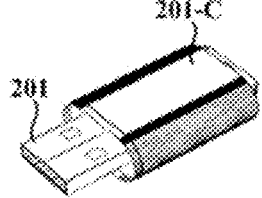
FIGS. 4 and 5 are examples of types of cheering stick control message transmitter according to an embodiment of the present disclosure.
Figure 5:
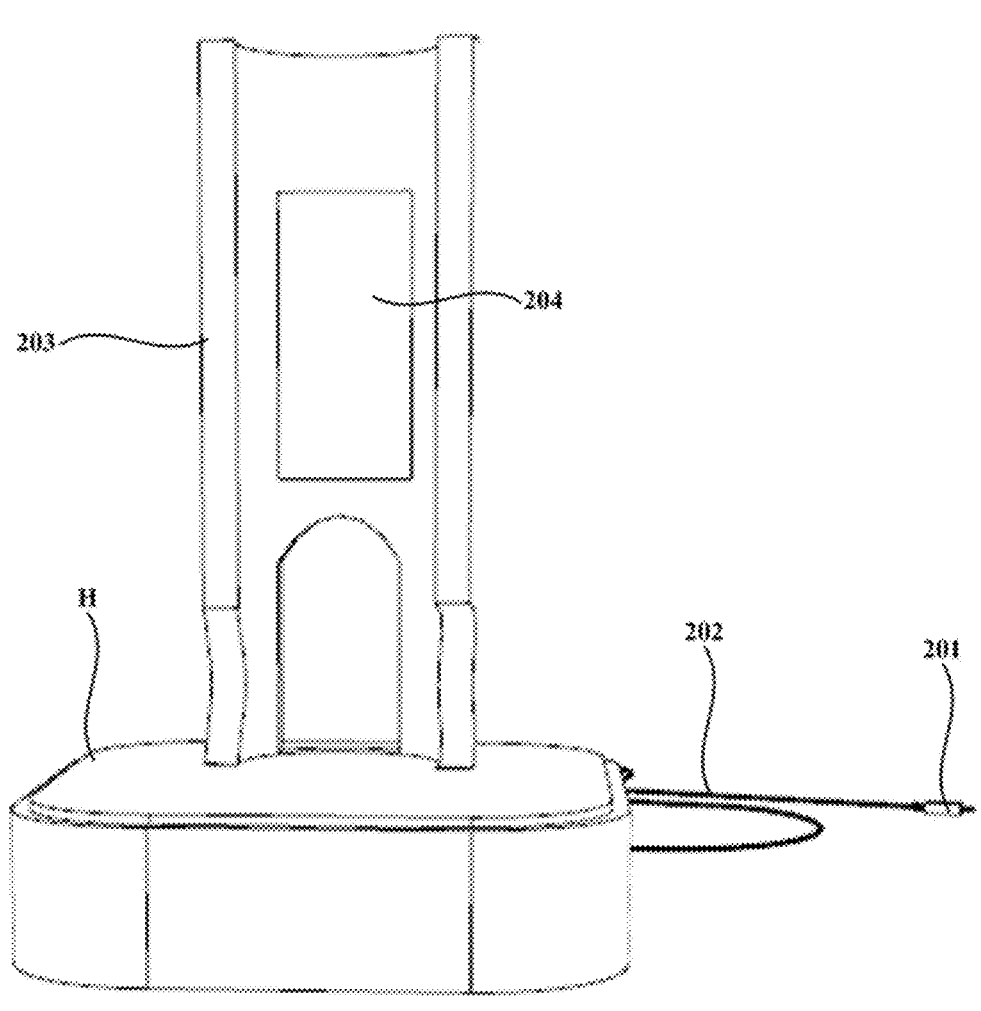

FIGS. 4 and 5 are examples of types of cheering stick control message transmitter according to an embodiment of the present disclosure.

FIG. 4 is an example in which the transmitter 200 is implemented as a removable drive type (in what follows, it is referred to as a USB type), and FIG. 5 is an example in which the transmitter 200 is implemented as a cradle type.

Referring to FIG. 4, when the transmitter 200 is a USB type according to an embodiment, the transmitter 200 may include a connector 201 and a USB case 201-C.

The connector 201 may be a port portion having a structure capable of being coupled to a predetermined port included in the interface module 140 of the terminal 100.

Although FIG. 4 shows a connector 201 with a USB-A structure that may be coupled to a general desktop-type computing device, the connector shape may differ depending on various specifications and the socket shapes of the port.

The USB case 201-C is a portion for protecting various components included in the transmitter 200, and various embodiments may exist according to the shape and material of the USB case 201-C.

The USB-type transmitter 200 does not require the installation of a separate driver; still, each user receives the same signal as transmitted from a performance site at the user's home by simply coupling the transmitter 200 to the terminal 100, and thereby an effect of increasing the user's convenience is obtained.

Meanwhile, referring to FIG. 5, when the transmitter 200 is a cradle type according to another embodiment, the transmitter 200 may include a connector 201, a cable 202, a holder 203, and a coupling port 204, and a housing H.

According to another embodiment, when the transmitter 200 is implemented as a cradle type, the transmitter 200 may take the form of a holder to connect the cheering stick 300 and may further perform the role of charging the cheering stick 300 being held.

The connector 201 is applied with necessary changes to the description in the above embodiment and may be included on at least one of both ends of the cable 202.

The cable 202 is a power line for the wired transmission of electrical signals generated from the terminal 100 to the transmitter 200 and electrically connect the terminal 100 and the transmitter 200 to each other.

Also, the cable 202 may include at least one or more connectors 201 at both ends; the specification and socket type of the connector 201 included in the cable 202 may vary according to various embodiments, such as USB-A, USB-C, 5 pin, and 8 pin, but the present disclosure is not limited to the specific example above.

The holder 203 may be a portion for hanging or placing a cheering stick 300 or a battery pack inserted to the cheering stick 300 on the transmitter 200.

The coupling port 204 may be a portion to which the cheering stick 300 or a battery pack inserted into the cheering stick 300 is electrically coupled. Here, the coupling port 204 may play the role of charging the battery of the cheering stick 300.

Also, constituting elements of the transmitter 200 including the control message transmitting unit 210, the control message receiving unit 220, and the controller 230 may be disposed inside the housing H.

Also, as shown in the figure, the housing H may have a structure and shape parallel to the ground to maintain the cheering stick 300 or the battery pack to be in a firmly loaded state.

Since the cradle-type transmitter 200 may transmit a message controlling the cheering stick 300 and charge the cheering stick 300 simultaneously, the efficiency for the user to manage the cheering stick 300 increases in that the user does not need to have a separate device or time for charging the cheering stick 300.

Cheering Stick 300

In the embodiment of the present disclosure, the cheering stick 300 may be a predetermined device that emits light according to a control signal received from the terminal 100 or/and the cheering stick control message transmitter 200 based on a cheering stick control service.

Figure 6:
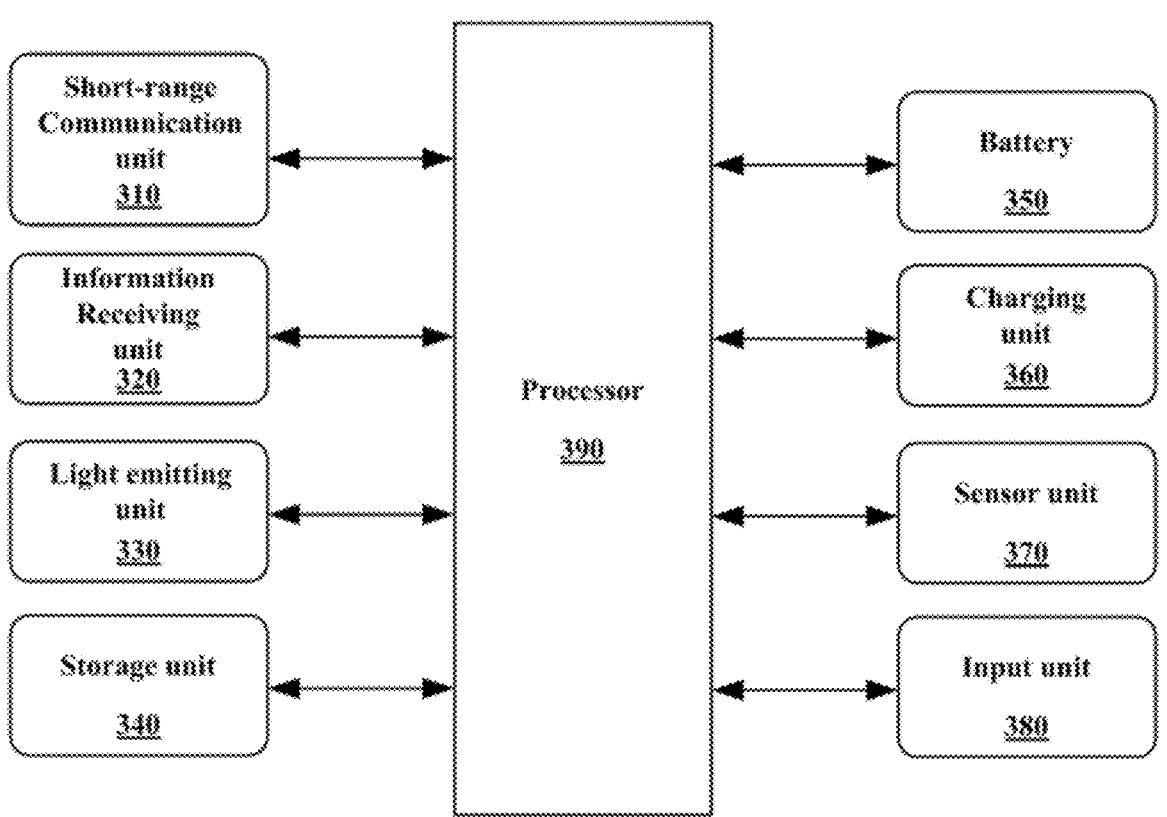
FIG. 6 is an internal block diagram of a cheering stick according to an embodiment of the present disclosure.

FIG. 6 is an internal block diagram of a cheering stick according to an embodiment of the present disclosure.

Referring to FIG. 6, in the embodiment, the cheering stick 300 may include a short-range communication unit 310, an information receiving unit 320, a light emitting unit 330, a storage unit 340, a battery 350, a charging unit 360, a sensor unit 370, and a processor 390.

The short-range communication unit 310 may include one or more devices for communicating with an external device. The short-range communication unit 310 may communicate through a wired or/and wireless network.

In the embodiment, the short-range communication unit 310 may transmit and receive various data related to a cheering stick control service to and from another terminal and/or an external server.

Specifically, in the embodiment, the short-range communication unit 310 may receive various data by establishing a communication connection to other devices to perform charging by being connected to the transmitter 200 in a wired manner based on a connector included in the transmitter 200 or to perform pairing for making an external device such as a kiosk recognize the cheering stick 300.

The short-distance communication unit 310 may include a wireless communication module (e.g., at least one of an NFC module, an RF transceiver, a ZigBee module, a Bluetooth module, and a WiFi module).

The information receiving unit 320 may include a broadcast receiver that receives information transmitted by a broadcasting method from the transmitter 200 and other devices. Specifically, the broadcast receiver may receive a radio wave transmitted from the transmitter 200 through an antenna and demodulate the received radio wave to restore a control message.

Through the method above, in the embodiment, the information receiving unit 320 may receive a cheering stick control message included in a signal transmitted by a broadcasting method from the transmitter 200.

Here, in the embodiment, the control message may be a message for controlling a cheering stick based on light emission pattern data pre-stored in the cheering stick 300.

The light emitting unit 330 may perform a function of emitting light according to a control message received by the information receiving unit 320.

The light emitting unit 330 may include one or more light source elements, and the light source may include a light emitting diode (LED). Also, the light emitting unit 330 may include LEDs of different colors; for example, the light emitting unit 330 may include at least one of a red LED, a green LED, a blue LED, and a white LED.

When the light emitted from each of these LEDs is mixed, a wide range of colors may be created, and the mixed color is determined based on the ratio of the intensities of light emitted from each LED, where the intensity of light emitted from each LED may be proportional to the driving current of the LED.

A plurality of LEDs included in the light emitting unit 330 may be arranged in the form of dots, where a specific word (text), image, or video may be displayed as the plurality of LEDs are selectively turned on or off according to the control of the processor 390 described later. In the description above, an LED is used as a light source of the light emitting unit 330, but the type of light source is not limited to the LED. According to another embodiment, an organic light emitting diode (OLED) may also be used as the light source.

The storage unit 340 may store one or more of various application programs, applications, data, and commands for providing a cheering stick control service environment.

Also, the storage unit 340 may store data received from or generated by other constituting elements of the cheering stick control system. The storage unit 240 may be, for example, one of various storage devices such as a ROM, an EPROM, a flash drive, and a hard drive and may include a memory, a cache, and a buffer.

In the embodiment, the storage unit 340 may pre-store the information necessary to perform a light emission function of the cheering stick 200.

For example, the storage unit 240 may pre-store light emission pattern data.

A light emission pattern means a light-emitting form in which the cheering stick 300 operates according to the constituting elements including light emission (e.g., turning on or off), color, and brightness.

The light emission pattern may also include, as a constituting element, a light emission effect in which the constituting elements are configured to change within a predetermined time to create a dynamic visual effect.

For example, the light emission effect may include 1) a blinking effect that turns on and off a cheering stick quickly by setting light emission operation differently for each period within a predetermined time, 2) a gradation effect that gradually changes light emission color by setting the color differently for each period within a predetermined time, and 3) a fade in/out effect that makes a cheering stick gradually darken or brighten by setting the brightness differently for each period.

The light emission pattern data means the data including the respective light emission pattern setting values defined in the embodiment for expressing all colors and brightness levels that the cheering stick may implement. For example, the light emission pattern data may include a plurality of data having a value of (0, 0, 0), (0, 0, 1), (0, 0, 2), . . . , (n, n, n) for expressing color. Also, the light emission pattern data may include a plurality of data having a value of 0, 1, 2, . . . , n for expressing brightness.

In the embodiment, the light emission pattern data may include a library or/and a scenario.

The library refers to the data preconfiguring the light emission pattern of the cheering stick 300 and may include an identification number and constituting element setting values (in what follows, light emission pattern setting values) for a light emission pattern.

For example, the color included in the light emission pattern setting value may be set by a hexadecimal code representing an RGB color, and the brightness included in the light emission pattern setting value may be set by a brightness value ranging from 0 to 100, where the higher the brightness value, the brighter the emitted light.

For example, a first library may mean the data set with an identification number 0001, light emission operation ON, a first color, first brightness, and a first light emission effect. More specifically, the first library may be a binary array indicating a light emission pattern setting value of (0001/ON/255, 0, 0/50, Blink). Also, a third library may be a binary array indicating a light emission pattern setting value of (0003/ON/0, 0, 255/10/Grad). Meanwhile, since the light emission operation is OFF for the case of a second library, the light emission pattern setting values corresponding to color, brightness, and light emission effect may not be set.

A scenario is the data for operating the cheering stick 300 by changing the light emission pattern of the cheering stick 300 for a pre-configured time by setting the operation time (in what follows, a library setting value) of at least one or more libraries for a predetermined time, where the data may include a scenario identification number for identifying each scenario.

The scenario may correspond to, for example, a single song. In other words, the operation time of one scenario is the same as the playback time of one song, so that while the song is played, the cheering stick 300 may operate by changing the light emission pattern according to the library setting value.

For example, a first scenario may be the data defined to have an identification number 001 and operate as a first library for 5 seconds, then operate as a second library for 3 seconds, and then operate as a third library for 2 seconds. More specifically, the first scenario may include a library setting value of (001, 0001-5 sec/0002-3 sec/0003-2 sec). Also, the second scenario may include a library setting value of (002, 0005-8 sec/0002-30 sec/0003-14 sec).

The control message includes only the identification code for identifying the first light emission pattern data to be operated among pre-stored light emission pattern data and command data for activating (e.g., executing, stopping, or ending) a cheering stick according to the first light emission pattern data.

In other words, since the control message according to the embodiment includes only the identification code and the command data and does not need to include emission pattern data including a scenario and a library, so an advantage is obtained in that a cheering stick may be controlled in a variety of ways through a low-capacity control messages.

Also, in the embodiment, the storage unit 340 may store information necessary to perform a cheering stick control service.

The battery 350 may receive external and/or internal power under the control of the processor 390 to supply the power required to operate each constituting element of the cheering stick 300.

The battery 350 may further include a DC/DC converter capable of converting the received power to a voltage level that may be used by the components of the cheering stick 300.

Also, the battery 350 includes at least one or more battery cells. The battery cell is not particularly limited to a specific type as long as the battery cell may be repeatedly charged and discharged, such as a lithium-ion cell.

The charging unit 360 may include a wired and wireless charging module for providing a wired and wireless charging process for supplying the power required for the operation of the cheering stick 300.

In the embodiment, the charging unit 360 may provide the power required for the cheering stick 300 which is held in the cradle-type transmitter 200.

The sensor unit 370 may include at least one of a position sensor (IMU), an acceleration sensor, a gyro sensor, a distance sensor, a proximity sensor, and a contact sensor.

Specifically, the position sensor (IMU) included in the sensor unit 370 may detect at least one or more of motion and acceleration of the cheering stick 300. For example, the position sensor may be implemented as a combination of various position sensors such as an accelerometer, a gyroscope, and a magnetometer.

The input unit 380 may detect a user's input (e.g., a gesture, actuation of a button, or other types of inputs) related to a cheering stick control service.

Specifically, the input unit 380 may include a predetermined button and/or a touch sensor.

Also, the input unit 380 may be connected to an external controller to receive a user's input.

The processor 390 may perform the overall operation such as power supply control of the cheering stick 300 and a data processing function of controlling a signal flow between internal constituting elements of the cheering stick 300 and processing data. The processor 390 may include at least one processor.

Also, the processor 390 may communicate with each constituting element internally through a system bus and may include one or more predetermined bus structures including a local bus.

Also, the processor 390 may be implemented by using at least one of application-specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In the embodiment, the processor 390 may control the light emission pattern of the light output from the light emitting unit 330 by controlling the driving current of each LED of the light emitting unit 330.

Through the operation above, in the embodiment, the processor 390 may control the cheering stick 300 including a plurality of LEDs and may form a predetermined text, image, or video.

The cheering stick 300 including the above configuration may operate according to at least one or more data stored in the storage unit 340 under the control of the processor 390, and performance directing involving the cheering stick 300 in which a light emission pattern changes according to an artist's song may be performed at a place where the terminal 100 and the transmitter 200 are located (e.g., at the cheering stick 300 user's home).

Also, in the embodiment, the cheering stick 300 may emit light according to a control message received from the transmitter 200 based on the light emitting unit 330.

Also, in the embodiment, the cheering stick 300 may detect the motion and acceleration of the cheering stick 300 based on the sensor unit 370.

Also, in the embodiment, the cheering stick 300 may transmit data measuring the degree of detected motion to other devices.

Also, in the embodiment, the cheering stick 300 may receive the input of a user who manipulates the cheering stick 300 based on the input unit 380.

Also, in the embodiment, the cheering stick 300 may transmit the received data measuring the number of user inputs to other devices.

Figure 7:
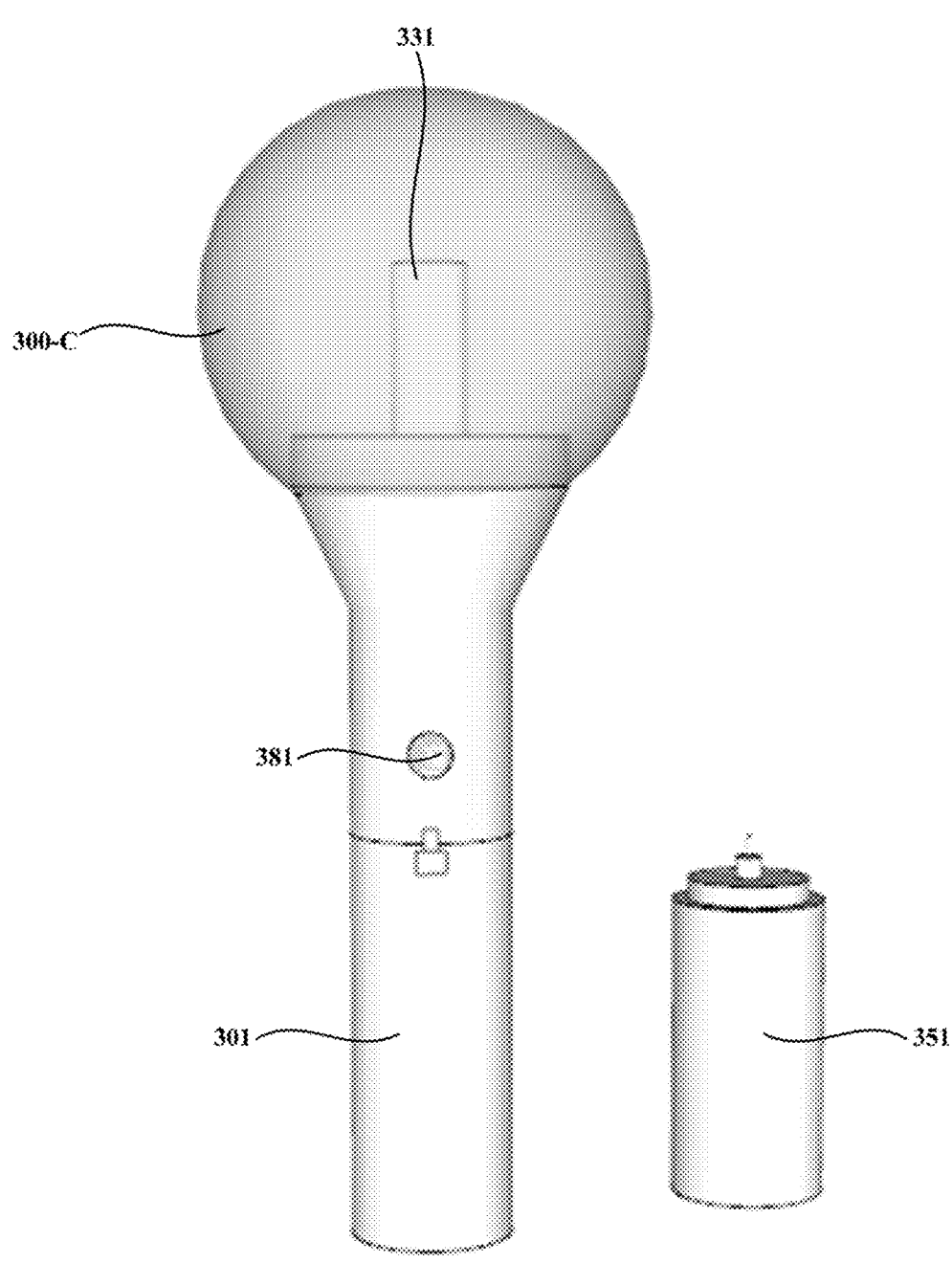
FIG. 7 is an example illustrating the shape of a cheering stick according to an embodiment of the present disclosure.

FIG. 7 is an example illustrating the shape of a cheering stick according to an embodiment of the present disclosure.

Referring to FIG. 7, in the embodiment, the cheering stick 300 may include a socket 300-C, a handle 301, an LED unit 331, a button module 351, and a button 381.

The socket 300-C may refer to a spherical case disposed on the upper part of a cheering stick, which encloses the LED unit 331 emitting light.

In general, the cheering stick has a spherical shape but may take a different shape from that shown in the figure according to the signature design of an artist with whom the cheering stick is associated.

The handle 301 is a portion extending from the socket 300-C in the longitudinal direction and may have an elongated shape so that a user using the cheering stick 300 may easily hold it in his/her hand.

The LED unit 331 includes at least one or more LEDs that emit light. The LED unit 331 may take a different form from that shown in the figure according to the signature color and design of the artist with whom the cheering stick is associated.

The battery module 351 includes at least one or more battery cells. The battery module 351 serves to supply power to the cheering stick 300 and may be disposed inside the cheering stick 300.

Also, the battery module 351 is detachable from the cheering stick 300 and may be separated according to the user's needs.

Also, the battery module 351 may further include a module detaching unit to enable coupling with a separate module.

The button 381 may be a switch that is formed on one side of the handle 301 and performs a pressing operation due to pressure. The user may control the light emission of the cheering stick or generate predetermined data by using the button 381.

The cheering stick 300 may further include a predetermined port (e.g., a C-type port) on one side for connection with another device.

Method for Providing Cheering Stick Control Service

In what follows, a method for providing a cheering stick control service by at least one processor of the terminal 100 according to an embodiment of the present disclosure based on the transmitter 200 will be described in detail with reference to appended drawings of FIGS. 8 to 10.

In the embodiment, a cheering stick control service refers to the service for controlling light emission of a cheering stick which is located in a remote place to conduct a cheering performance through cheering stick control according to the performance carried out through real-time, online streaming.

To this end, at least one processor of the terminal 100 may control light emission of the cheering stick 300 by transmitting, to the transmitter 200, a cheering stick control signal including a cheering performance matched to a performance streaming video played in the terminal 100.

In an embodiment of the present disclosure, at least one or more processors of the terminal 100 may execute at least one or more applications and/or programs (in the embodiment, the streaming program 111) stored in at least one or more memories 110 or run them in the background and may provide a cheering stick control service by transmitting data for a cheering performance to the cheering stick 300 through interworking with the controller 230 of the transmitter 200 controlled by the processor of the terminal 100.

In what follows, the assumption that the at least one or more processors perform the method for providing the cheering stick control service by operating to execute the commands of the program is simplified to the assumption that the terminal 100 performs the method.

Figure 8:
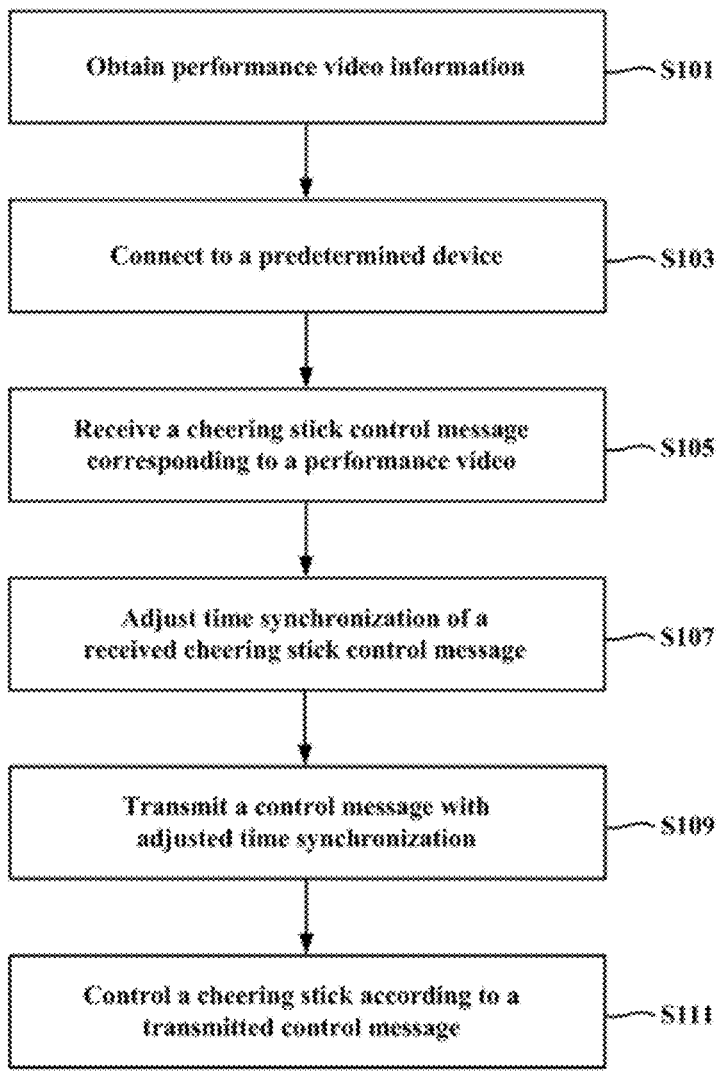
FIG. 8 is a flow diagram illustrating a method for controlling a cheering stick according to an embodiment of the present disclosure.

FIG. 8 is a flow diagram illustrating a method for controlling a cheering stick according to an embodiment of the present disclosure.

Referring to FIG. 8, in the embodiment, the terminal 100 may obtain a performance video S101.

Specifically, in the embodiment, the terminal 100 may be linked with an external streaming server and obtain a performance video to be output to the display of the terminal 100.

At this time, the performance video is a video output from the terminal 100, such as the user's smartphone or computer, and may be a video captured in real-time or a pre-recorded video.

Also, the performance video may be played based on the streaming program 111 pre-installed in the terminal 100. The performance video may include a video of a main artist in a performance hall and a video of the audience watching the artist in the performance hall.

To this end, an external streaming server may provide a streaming URL for installing and running the streaming program 111 on the terminal 100.

Also, in the embodiment, the terminal 100 may perform user authentication required to obtain the performance video.

For example, the terminal 100 may perform user authentication based on a login process and/or identity verification performed by the user who purchased a non-contact performance ticket on the streaming service page where the user purchased the performance ticket.

Also, in the embodiment, the terminal 100 may receive a user input requesting playing of the performance video after completing the user authentication.

At this time, the terminal 100 in the embodiment may show detailed information of the online performance selected based on the user input (e.g., the artist's name, the date of performance, and the start time of the performance) to a display.

For example, the terminal 100 may enable the user to check the information of the performance that the user wants to see by outputting the detailed information on the selected online performance to the display.

Accordingly, in the embodiment, the terminal 100 may obtain a performance video for the selected online performance by linking with the external streaming server based on the received user input.

Also, in the embodiment, the terminal 100 may recognize an electrically connected, predetermined device S103.

Specifically, in the embodiment, the terminal 100 may recognize an electrically connected, predetermined device (in what follows, it is referred to as the transmitter 200) through the interface module 140.

To this end, in the embodiment, the user may insert the transmitter 200 or a predetermined connector included in the transmitter 200 into a predetermined port included in the terminal 100.

At this time, in the embodiment, when the transmitter 200 is inserted into the port, the terminal 100 may select a pre-installed driver for each OS or automatically install the right driver compatible with the OS, recognize the inserted transmitter 200, and transmit and receive data according to the protocol due to the driver settings.

Also, in the embodiment, the terminal 100 may further display a guide for performing a network connection with the inserted transmitter 200 on the display.

Also, in another embodiment, the terminal 100 may be paired with a predetermined device (e.g., the cheering stick 300) based on short-range wired/wireless communication to transmit and receive data directly.

To this end, in another embodiment, the user may activate the Bluetooth function of the cheering stick 300 by powering up the cheering stick 300.

At this time, in another embodiment, after authentication, the terminal 100 may recognize at least one or more cheering sticks 300 for which the Bluetooth function has been activated.

By using the method above, the terminal 100 may transmit and receive predetermined data in conjunction with the recognized devices (in the embodiment, the transmitter 200 and the cheering stick 300).

Also, in the embodiment, the terminal 100 may receive a cheering stick control message for a cheering performance corresponding to the performance video S105.

Specifically, in the embodiment, the terminal 100 may receive a cheering stick control message corresponding to the performance video played in real-time from an external streaming server based on the streaming program 111.

At this time, in the embodiment, the terminal 100 may receive a cheering stick control message and a performance video in real-time through the external streaming server.

At this time, the cheering stick control message may be generated by a performance director who conducts a cheering performance that matches each performance. Also, the cheering stick control message may include a cheering stick control signal that sets light emission patterns of at least one or more cheering sticks 300 in offline and online performances.

For example, in an offline performance, the cheering stick control signal may be set differently for the seats of the audience so that a predetermined character or shape may be seen from a distance; in an online performance, the cheering stick control signal may be set differently according to the number of viewers and the sitting order at remote places.

In the embodiment, the terminal 100 may receive a cheering stick control message pre-built or generated in real-time based on the streaming program 111 that plays a performance video in conjunction with the external streaming server.

In the embodiment, the cheering stick control message may be generated by a performance director's determining the light emission patterns of cheering sticks carried by the audience in an offline performance hall through a control terminal.

For example, the performance director may determine the light emission pattern to make cheering sticks in a performance hall blink in red at a particular timing of a particular song and transmit a cheering stick control message to the performance hall so that the cheering sticks in the performance hall are controlled according to the determined light emission pattern.

At this time, the terminal 100 transmits a cheering stick control message through the transmitter 200 to the cheering stick 300 so that a user who watches a performance video through online streaming acts according to the same light emission pattern as that of a cheering stick in the performance hall at a particular timing of a particular song from the performance video, thereby enabling the user to feel as if the user carries out the same cheering performance with the audience in the offline performance hall.

However, the performance director may generate and transmit a cheering stick control message so that a plurality of the cheering sticks operates in different light emission patterns depending on the locations in the performance hall.

In this case, a control signal that operates as a light emission pattern for controlling the largest number of cheering sticks in the performance hall may be determined as the cheering stick control message.

In other words, the cheering stick control message may be a control signal matched to a control signal for controlling the light emission pattern of cheering sticks of the audience in the performance hall.

In another embodiment, a performance director and/or a streaming server may generate the cheering stick control message for the users who watch a performance online.

For example, the cheering stick control message may include a control signal for controlling the cheering stick 300 so that the cheering stick 300 may operate according to a light emission pattern matched to the light emission pattern of a lighting device illuminating an artist in a real-time performance video.

Also, the cheering stick control message may include a control signal for controlling the motion of the cheering stick 300 so that the light emission pattern is changed according to the gesture or voice of an artist in a real-time performance video.

Meanwhile, the cheering stick control message may be a control signal including information on a light emission pattern according to which the cheering stick 300 operates.

In the embodiment, the cheering stick control message may include command data that activate the cheering stick 300 to operate according to cheering preparatory data including a library or a scenario pre-stored in the cheering stick 300.

To this end, the cheering stick 300 may store in advance cheering preparatory data including a scenario and a library related to a streaming performance video.

The cheering preparatory data may be generated in advance for each performance and stored in the cheering stick 300 by being distributed before the performance is streamed.

Also, according to an embodiment, the cheering preparatory data may be continually updated and distributed from an external streaming server rather than a specific performance.

Specifically, the cheering stick 300 may include the first cheering preparatory data stored by default when it is first sold and later obtain and store the second cheering preparatory data in which a performance director sets a light emission pattern for a predetermined period according to a specific performance.

Accordingly, the control message may perform directing through the first cheering preparatory data and directing through up to the second cheering preparatory data depending on whether the cheering stick 300 has stored the second cheering preparatory data before the online performance.

For example, the control message transmitted by the terminal 100 may make a plurality of cheering sticks 300 show different light emission patterns according to the number of cheering sticks of the users watching a streaming video through the terminal 100 and the positions where the cheering sticks are placed, thereby conducting an organized light emission performance when viewed as a whole.

Specifically, when receiving the second cheering preparatory data for a streaming video of a specific performance through the terminal 100, users may input information on the number of cheering sticks and the arrangement of cheering sticks. For example, when watching an online performance at a movie theater, a user may obtain the arrangement information of the cheering stick 300 by inputting the seat arrangement information of the ticket into the terminal 100.

The terminal 100 may receive, from a server, the second cheering preparatory data matched to the corresponding cheering stick according to the number of cheering sticks and arrangement information thereof and deliver the received second cheering preparatory data to the cheering stick 300.

At this time, cheering sticks disposed at different positions may receive the second cheering preparatory data having the same identification number but having different light emission pattern setting values, respectively.

Afterwards, individual cheering sticks receiving control messages that activate the second cheering preparatory data may operate differently from each other according to the respective light emission pattern setting values of the received second cheering preparatory data.

For example, when cheering sticks receive the second cheering preparatory data that control a first cheering stick at a first position in a row to emit light at a first timing and then turn off, a second cheering stick at a second position to emit light at a second timing after the first timing and then turn off, and a third cheering stick at a third position to emit light at a third timing and then turn off, it may be possible to control a plurality of cheering sticks to generate a wave when viewed as a whole.

As described above, when the cheering stick control message is composed of command data for activating (executing, stopping, or ending) a library or/and a scenario including a light emission pattern pre-stored in the cheering stick 300 in synchronization with a performance video, an advantage is obtained in that cheering sticks may be controlled in a variety of ways through a low-capacity control messages.

Upon receiving the cheering stick control message, the terminal 100 may adjust the time synchronization of the received cheering stick control message S107.

Specifically, in the embodiment, the terminal 100 may adjust the time synchronization of a received cheering stick control message based on a video transmission time and transmit the adjusted time synchronization to the cheering stick 300 through the transmitter 200.

In the embodiment, time synchronization (time sync) refers to adjusting the transmission time of a cheering stick control message according to the video output timing since communication speeds of a plurality of user terminals 100 streaming a performance video may vary depending on network conditions and a communication method, and accordingly, the timing of a performance video output from the display of user terminals 100 and the timing of transmitting a cheering stick control message from the transmitter 200 also become different.

In other words, in the embodiment, since the terminal 100 transmits a video transmission reference time when a cheering stick control message is transmitted to the respective terminals 100 used by a plurality of users, each terminal 100 may control the cheering stick based on the same video transmission reference time.

To this end, in the embodiment, a performance video may include a plurality of control signal start points, and the control signal start points may be preset according to the table of contents of the performance, an artist's song, and the like.

Figure 9:
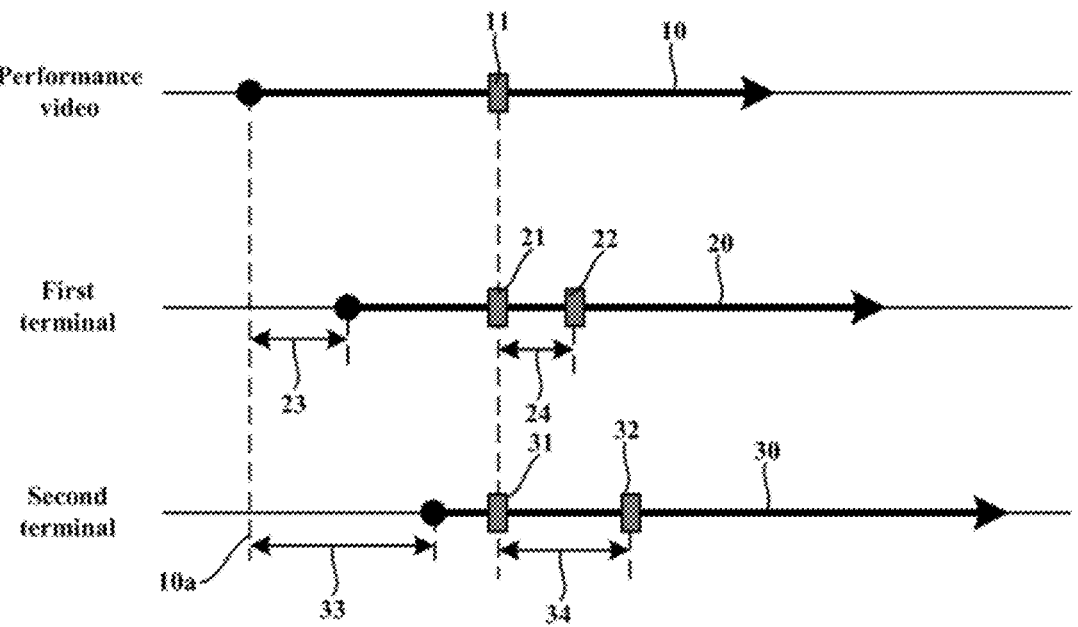
FIG. 9 illustrates a method for adjusting time synchronization by a terminal according to an embodiment of the present disclosure.

FIG. 9 illustrates a method for adjusting time synchronization by a terminal according to an embodiment of the present disclosure.

Referring to FIG. 9, a first section 10 set in a performance video transmitted from an external streaming server according to the order of performances, an artist's song, and the like, a second section 20 output from a first terminal, and a third section 30 output from a second terminal are disclosed.

In the embodiment, the terminal 100 may detect a control signal start point included in a performance video obtained.

Also, in the embodiment, the terminal 100 may set a control signal transmission point after a predetermined time from the detected control signal start point.

In other words, in the embodiment, the terminal 100 may control the cheering stick based on the control signal transmission point regardless of the play section of a performance video currently output from each user's terminal 100.

Since the first terminal and the second terminal receive a performance video based on the streaming program installed in each terminal 100 from an external streaming server through network communication, the video output start point 10a of the second section 20 and the third section 30 output to the display of each terminal may be different from that of the first section 10 due to the network environment and communication delay.

At this time, for the convenience of description, it is assumed that the video output start point 10a is the same as the control signal start point.

For example, referring to FIG. 9 again, the second section 20 output from the first terminal may be delayed by the first time 23 due to the network environment. In the same way, depending on the network environment, the third section 30 of the second terminal may also be delayed by the second time 33.

In other words, the first scene output at the first reference point 11 from the performance video may be output at the first playback point 22 delayed by the first time 24 from the first reference point 11 in the first terminal.

In the same way, the first scene output at the first reference point 11 from the performance video may be output at the second playback point 32 delayed by the second time 34 from the first reference point 11 in the second terminal.

Meanwhile, in the embodiment, the terminal 100 may set a control signal transmission point corresponding to the first reference point 11 to a received cheering stick control message regardless of the delay of the first time 24 and the second time 34.

For example, the first terminal may set the same first control signal transmission point 21 as the first reference point 11 to the first cheering stick control message.

In the same way, the second terminal may set the same second control signal transmission point 31 as the first reference point 11 to the second cheering stick control message.

In this way, each terminal may adjust time synchronization of a received cheering stick control message by setting a control signal transmission point based on a predetermined reference point preset in a performance video regardless of the video output start point 10a.

Also, in the embodiment, the terminal 100 may transmit a control message with adjusted time synchronization S109.

Specifically, in the embodiment, the terminal 100 may transmit a control message with adjusted time synchronization to at least one or more cheering sticks 300 based on a transmitter 200 recognized by and connected to a predetermined port included in the terminal 100.

In the example above, in the embodiment, the first terminal 100-1 may transmit a first cheering stick control message with time synchronization adjusted to a first control signal transmission point 21 to the first transmitter 200-1.

Accordingly, in the embodiment, the first transmitter 200-1 connected to the first terminal 100-1 may transmit the first cheering stick control message transmitted from the first terminal 100-1 through a broadcasting method.

At this time, the first transmitter 200-1 may simultaneously transmit the first cheering stick control message to at least one or more cheering sticks 300 powered up and physically adjacent to each other.

In the same way, in the embodiment, the second terminal 100-2 may transmit the second cheering stick control message with time synchronization adjusted to the second control message transmission point 31 to the second transmitter 200-2. Accordingly, in the embodiment, the second transmitter 200-2 connected to the second terminal 100-2 may transmit the second cheering stick control message received from the second terminal 100-2 through a broadcasting method.

Also, in another embodiment, the terminal 100 may directly transmit a control message with adjusted time synchronization to at least one or more cheering sticks 300 recognized by and connected to the terminal 100 based on short-range communication.

Also, in the embodiment, the terminal 100 may control the cheering stick 300 according to a transmitted control message S111.

Specifically, in the embodiment, the terminal 100 may control an LED and a vibration sensor included in the cheering stick 300 according to the transmitted control message.

At this time, in the embodiment, the terminal 100 may simultaneously control at least one or more cheering sticks 300 connected to the network of the terminal 100 by matching to the performance video.

Figure 10:
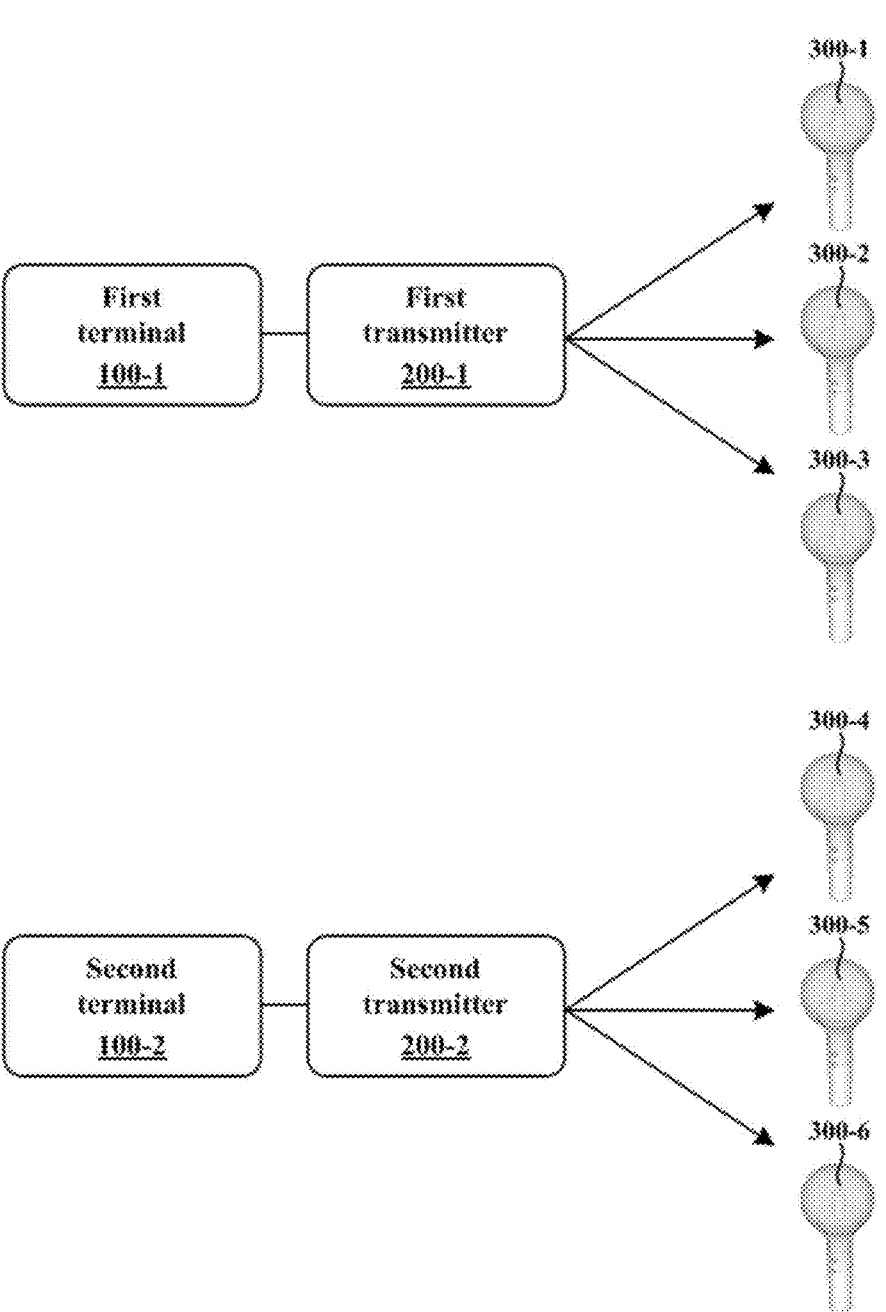
FIG. 10 illustrates a method for controlling a cheering stick by a terminal according to an embodiment of the present disclosure.

FIG. 10 illustrates a method for controlling a cheering stick by a terminal according to an embodiment of the present disclosure.

Referring to FIG. 10, the first terminal 100-1 and the second terminal 100-2 are computing devices that exist in physically different locations, and the first transmitter 200-1 and the second transmitter 200-2 may be connected to the first terminal 100-1 and the second terminal 100-2, respectively.

Also, the first to third cheering sticks 300-1, 300-2, 300-3 may be a plurality of cheering sticks 300 located close to the first terminal 100-1 and connected to the network of the first terminal 100-1 based on short-range communication, but located at physically different positions from the fourth to sixth cheering sticks 300-4, 300-5, 300-6.

At this time, for example, the first terminal 100-1 and the second terminal 100-2 may output the same performance video to the display based on the streaming program 111 installed in each terminal.

Even if the time synchronization of the performance video exposed to the displays of the first terminal 100-1 and the second terminal 100-2 varies depending on the network conditions, the first to sixth cheering sticks 300-1, 300-2, 300-3, 300-4, 300-5, 300-6 linked to the respective terminals may be controlled according to a cheering stick control message transmitted by the first transmitter 200-1 and the second transmitter 200-2 and operate according to the same light emission pattern.

In other words, in the embodiment, if the terminal 100 accesses a streaming URL playing the same performance video, the terminal 100 may control a plurality of cheering sticks 300 by transmitting a cheering stick control message matched to the performance video in real time.

Also, in another embodiment, when cheering preparatory data for executing a cheering stick control message is previously generated, the terminal 100 may download the previously generated cheering stick control message from an external server and by transmitting the previously generated control message to the cheering stick 300 to prepare the cheering stick 300 to provide a cheering stick control service.

In another embodiment, the terminal 100 may perform short-range communication with the transmitter 200 and the cheering stick 300 to directly and/or indirectly transmit data including a plurality of previously generated cheering stick control messages to the cheering stick 300.

At this time, the cheering stick 300 that has received the previously generated cheering preparatory data from the terminal 100 and/or the transmitter 200 may store the cheering preparatory data in the storage unit 340.

For example, when the user places the cheering stick 300 on the cradle-type transmitter 200, the cheering stick 300 may perform a charging process and simultaneously receive the cheering preparatory data from the terminal 100 and store the cheering preparatory data in the storage unit 340.

Next, in another embodiment, when the streaming program 111 executed in each terminal 100 starts to expose a performance video, the terminal 100 may read cheering preparatory data pre-stored in the storage unit 340 and execute the cheering stick 300 according to command data of a cheering control message, thereby controlling the cheering stick 300 according to a light emission pattern within the cheering preparatory data.

Also, in another embodiment, the terminal 100 may transmit different cheering preparatory data to each of a plurality of cheering sticks 300 connected to the terminal 100 and make each cheering stick 300 store the cheering preparatory data in the storage unit of the cheering stick 300, thereby controlling each cheering stick 300 to emit light according to a pattern different from the others.

For example, when the terminal 100 stores cheering preparatory data having the same library identification number but different light emission patterns in the respective cheering sticks to prepare for performance directing and then broadcasts the same cheering stick control message, individual cheering sticks may operate light emission patterns set differently from each other. For example, if a first library stored in a first cheering stick has a light emission pattern blinking in red, a first library stored in a second cheering stick has a light emission pattern throttling in blue, and a cheering control message includes a command message for starting operation according to the first library, the first cheering stick that has received the cheering stick control message may blink in red, and the second cheering stick may throttle in blue.

In other words, the terminal 100 according to the embodiment of the present disclosure may control the cheering stick 300 to emit light or generate vibration according to an artist's song even for a performance video broadcast online, thereby improving the satisfaction of the audience (in the embodiment, a user) enjoying the online performance.

Also, in the embodiment of the present disclosure, the terminal 100 may transmit a cheering stick control message as used in an offline performance to the cheering stick 300 and simultaneously control at least one or more cheering sticks 300 simply by connecting a USB-type transmitter 200 to the terminal 100, thereby increasing the sense of presence of an online performance.

Also, in the embodiment, the terminal 100 may simultaneously control cheering sticks even if playback timing of a video exposed through a display differs due to network conditions, thereby performing consistent control of a cheering stick without being influenced by the user's location.

Method for Outputting Content Including User Input Based on Cheering Sticks by Terminal In what follows, a method for outputting content including a user input based on a cheering stick 300 by at least one processor of a terminal 100, a transmitter 200 and the cheering stick 300 according to an embodiment of the present disclosure will be described in detail with reference to appended drawings of FIGS. 11 and 12.

In an embodiment of the present disclosure, at least one or more processors of the terminal 100 may execute at least one or more applications and/or programs (in the embodiment, the streaming program 111) stored in at least one or more memories 110 or run them in the background.

In what follows, the assumption that the at least one or more processors perform the method for outputting content including a user input based on a cheering stick 300 by operating to execute the commands of the program is simplified to the assumption that the terminal 100 performs the method.

Figure 11:
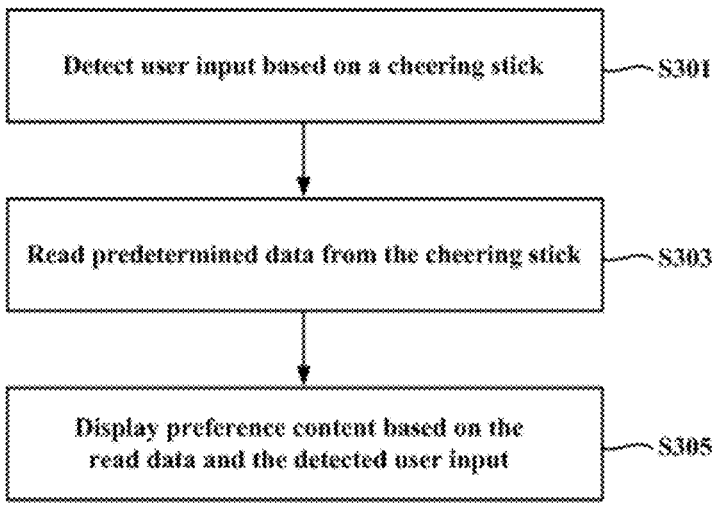
FIG. 11 is a flow diagram illustrating a method for outputting a user input based on a cheering stick in the form of content by a terminal according to an embodiment of the present disclosure.

FIG. 11 is a flow diagram illustrating a method for outputting content including a user input based on a cheering stick by a terminal according to an embodiment of the present disclosure.

Referring to FIG. 11, in the embodiment, the terminal 100 may detect a user input based on the cheering stick 300 S301.

For example, the user may provide a user input such as pressing a button included in the cheering stick 300 or shaking the cheering stick 300 to show a preference for an online performance video while watching the video based on the streaming program 111.

Specifically, the cheering stick 300 including a predetermined button and/or touch sensor may detect a user's button click input, and include the detected user input in the user input information.

Also, by using a haptic input sensor (e.g., a gyro sensor or an accelerometer), the cheering stick 300 may detect a gesture input generated by the user's shaking the cheering stick 300. Specifically, the cheering stick 300 may generate user input information by detecting the number of times the user shakes the cheering stick 300 back and forth in one direction for a unit time.

Also, by default, the cheering stick 300 may include predetermined data in the user input information. Specifically, predetermined data may further include at least one piece of information among a serial number for identifying the cheering stick 300, artist information matched to the cheering stick 300, model (or version) information of the cheering stick 300, and a cheering stick image.

Then, the cheering stick 300 may transmit the user input information generated as described above to the terminal 100.

Specifically, the cheering stick 300 may transmit the user input information to the terminal 100 directly or through the transmitter 200 based on short-range communication.

For example, the cheering stick 300 may be paired with the terminal 100 to directly transmit the user input information to the terminal 100 through Bluetooth communication.

In the embodiment, the terminal 100 may receive user input information from a plurality of cheering sticks 300 through the transmitter 200.

Specifically, the cheering stick 300 may convert the user input information into a second RF signal, a radio wave in a preset frequency band, and transmit the second RF signal to the surroundings.

Then, the transmitter 200 may control the control message transmitting unit 210 to have a transmission mode for transmitting a control message for controlling the cheering stick 300 as a first RF signal and the control message receiving unit 220 to have a reception mode for receiving a second RF signal including user input information from the cheering stick 300.

In the embodiment, the transmitter 200 includes an antenna capable of transmitting and receiving one RF signal, by switching the transmission and reception modes according to time division may perform the role of the control message transmitting unit 210 for a first period and perform the role of the control message receiving unit 220 for a second period.

For example, the transmitter 200 may set the transmission mode for the first period, which is the time before or after a predetermined time from the start of the first video content in the streaming video and transmit the control message received from the terminal 100 to the unspecified nearby cheering sticks 300 after converting the control message to the first RF signal in the preset frequency band.

Upon receiving the control message, the cheering stick 300 activates the cheering preparatory data to operate according to a preset light emission pattern for a preset operation time.

Therefore, even if the transmitter 200 is switched to the reception mode for the time including the preset operation time of the cheering stick 300 according to the control message, the cheering stick 300 may continue to operate.

Therefore, the transmitter 200 may be switched to the reception mode for receiving user input information for the second period from when the first period ends.

Accordingly, the transmitter 200 may receive the second RF signals in the preset frequency band transmitted from unspecified cheering sticks 300.

Then, the transmitter 200 may convert the received second RF signal into user input information and transmit the user input information to the terminal 100.

Accordingly, in the embodiment, the terminal 100 may receive the user input information recognized by the cheering stick 300.

Also, in the embodiment, the terminal 100 may determine predetermined data from the user input information S303.

Specifically, in the embodiment, the terminal 100 may determine predetermined data stored in the storage unit 340 of the cheering stick 300 which has detected the user input.

The predetermined data may include the serial number of the cheering stick 300 which has transmitted the user input information and the number of user inputs through the cheering stick 300 (e.g., the number of times a user shakes the cheering stick or the number of times a user has pressed a specific button for a unit time).

At this time, in the embodiment, if user input is detected for a plurality of cheering sticks 300, the terminal 100 may read predetermined data separately from each cheering stick 300.

Also, in the embodiment, the terminal 100 may reflect the feedback content to the streaming video based on the predetermined data S305.

Since the user will see the streaming video output from the terminal 100 from a distance, feedback on the online performance may be input through the cheering stick 300 as user input information.

Upon receiving the feedback, the terminal 100 may transmit the feedback according to the user input information to the streaming server to assess online viewers' reactions to the online performance.

Also, the terminal 100 may display feedback content according to the user input information on the streaming video or in a chatting window on the streaming video.

In the embodiment, the feedback content may refer to data output to the display of the terminal 100 in the form of text, an image, or a video by considering information that the user inputs to the cheering stick 300 as a preference for the online performance.

The feedback content may include a cheering stick image, an accumulated number of times a cheering stick button is pressed, the number of times a cheering stick is shaken, and an effect due to the user input to the cheering stick.

Figure 12:
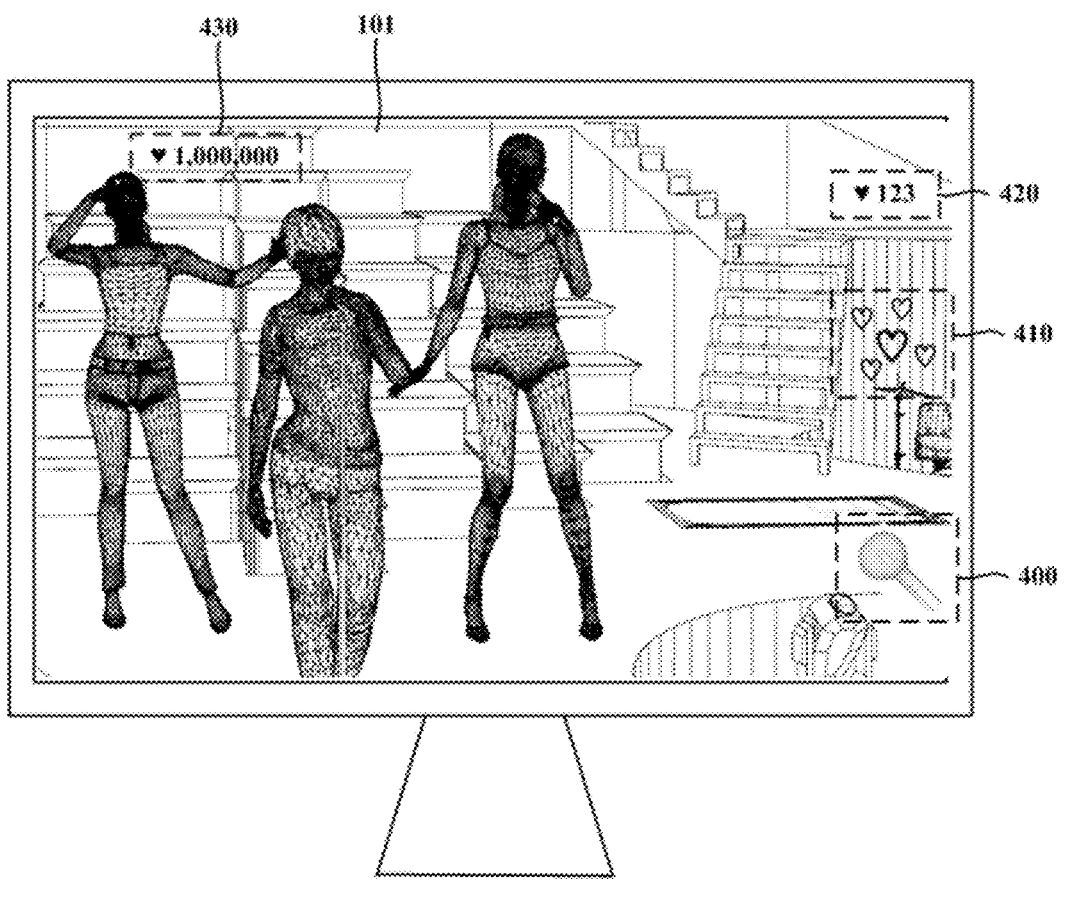
FIG. 12 illustrates an example of feedback content displayed on a terminal's display according to an embodiment of the present disclosure.

FIG. 12 illustrates an example of feedback content displayed on a terminal's display according to an embodiment of the present disclosure.

Referring to FIG. 12, an example of a performance video 101 obtained by executing the streaming program 111 and output on the display of the terminal 100 is shown.

In the embodiment, the terminal 100 may display predetermined feedback content on one side of the streaming program 111 outputting the performance video 101.

Also, in the embodiment, the terminal 100 may read the cheering stick image data from the cheering stick 300 and display the first cheering stick image 400.

Also, in the embodiment, since the displayed cheering stick image includes the shape of an official cheering stick designated for each artist, different cheering stick image data is included in each cheering stick 300 designated for the corresponding artist; accordingly, the cheering stick image displayed as feedback content may also be different.

Also, in the embodiment, the terminal 100 may display a first effect 410 and a first preference score 420 as feedback content according to detected user input.

At this time, in the embodiment, if user input is detected for a plurality of cheering sticks 300, the terminal 100 may display a different effect and a different score of preference for each cheering stick 300 as feedback content.

Also, in the embodiment, the displayed effect may be a graphic effect executed simultaneously as the user provides a user input using the cheering stick 300, and the preference score may be an aggregate of the number of user inputs.

The user input for displaying the first effect 410 and the first preference score 420 may include, for example, pressing a button included in the cheering stick 300 or activating a vibration sensor by shaking the cheering stick 300.

Also, in the embodiment, the terminal 100 may further display a first accumulated preference score 430 obtained by summing the user inputs performed by a plurality of users watching the performance video 101.

Meanwhile, in the embodiment, if user input is detected from a plurality of cheering sticks 300, the terminal 100 may display the feedback content including the first cheering stick image 400, the first effect 410, and the first preference score 420 as many pieces of as the number of cheering sticks 300 for which the user input has been detected.

As described above, a cheering stick control message transmitter, a cheering stick control system including the cheering stick control message transmitter, and a cheering stick control method using the cheering stick control message transmitter according to an embodiment of the present disclosure overcome low transmission speed, short transmission range, and low data capacity transmission rate, which are the disadvantages of Bluetooth Low Energy (BLE) technology, by using a broadcasting way, thereby saving the time required for pairing, which has to be performed for each cheering stick, and increasing the speed of data transmission.

Also, a cheering stick control message transmitter, a cheering stick control system including the cheering stick control message transmitter, and a cheering stick control method using the cheering stick control message transmitter according to an embodiment of the present disclosure receive a control message back from a cheering stick, thereby relieving the boredom of a user who watches a performance according to one-way signal transmission, generating the atmosphere of an actual performance hall in which an artist and the audience communicate interactively, and improving the satisfaction of a user who enjoys a non-contact performance.

Also, a cheering stick control message transmitter, a cheering stick control system including the cheering stick control message transmitter, and a cheering stick control method using the cheering stick control message transmitter according to an embodiment of the present disclosure do not require installing a separate driver and allow a user to receive the same signal as transmitted from a performance venue at home only by simply connecting a USB-type transmitter to the user's terminal, thereby improving the user's convenience and increasing the sense of presence of an online performance.

Also, a cheering stick control message transmitter, a cheering stick control system including the cheering stick control message transmitter, and a cheering stick control method using the cheering stick control message transmitter according to an embodiment of the present disclosure simultaneously transmit a message controlling a cheering stick and charge the cheering stick based on a cradle-type transmitter, thereby obviating the need for a user to have a separate device or time for charging a cheering stick and increasing efficiency for the user in managing the cheering stick.

Also, a cheering stick control message transmitter, a cheering stick control system including the cheering stick control message transmitter, and a cheering stick control method using the cheering stick control message transmitter according to an embodiment of the present disclosure control a cheering stick to emit light or generate vibration according to an artist's song even for a performance video broadcast online, thereby improving the satisfaction of the audience enjoying the online performance.

Also, a cheering stick control message transmitter, a cheering stick control system including the cheering stick control message transmitter, and a cheering stick control method using the cheering stick control message transmitter according to an embodiment of the present disclosure simultaneously control cheering sticks even if playback timing of a video displayed through a display differs due to network conditions, thereby performing consistent control of a cheering stick without being influenced by the user's location.

The embodiments of the present disclosure described above may be implemented in the form of program commands which may be executed through various types of computer elements and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as a ROM, a RAM, and a flash memory. Examples of program commands include not only machine codes such as those generated by a compiler but also high-level language codes which may be executed by a computer through an interpreter and the like. The hardware device may be configured to be operated by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

What is claimed is:

1. A cheering stick control method using a cheering stick control message transmitter, the method controlling a light emission pattern of a cheering stick through a cheering stick control message transmitter performed by at least one processor of a terminal, comprising:

linking to a cheering stick control message transmitter for data transmission and reception;

receiving a performance video and a cheering stick control message corresponding to the performance video; and transmitting the received cheering stick control message to a cheering stick through the cheering stick control message transmitter, wherein the cheering stick control message transmitter includes a control message receiving unit that receives a RF signal including user input information for the cheering stick from nearby cheering sticks, wherein the control message receiving unit includes a first control message receiving unit configured to receive a control message from the terminal, wherein the control message receiving unit further includes a second control message receiving unit configured to receive at least one or more user inputs from the cheering sticks, wherein a cheering performance is matched to the performance video in real-time, wherein the cheering performance includes a same light emission pattern as that of the cheering stick in the performance video at a particular timing of a particular song from the performance video, wherein the transmitting the received cheering stick control message includes:

switching, by the cheering stick control message transmitter, an antenna between a transmission mode for a first period and a reception mode for a second period in a time-division manner; and broadcasting, in the transmission mode, the cheering stick control message to the cheering stick, wherein the cheering stick control message includes command data that activates cheering preparatory data pre-stored in the cheering stick, and wherein the method further comprises receiving, in the reception mode, a second RF signal including user input information for the cheering stick from the cheering stick.

2. The method of claim 1, wherein the cheering stick control message includes at least one or more a light emission pattern control signal for controlling the operation, color, brightness, and light emission effect of an LED included in the cheering stick; and a vibration pattern control signal for controlling the operation, vibration intensity, and a vibration pattern of a vibration sensor included in the cheering stick.

3. The method of claim 1, wherein the cheering stick control message transmitter includes a control message transmitting unit that converts a cheering stick control message into a RF signal in a predetermined frequency band and transmits the converted RF signal to unspecified nearby cheering sticks in a broadcasting method.

4. The method of claim 1, further including:

receiving user input information received by the control message receiving unit from the cheering stick control message transmitter and displaying feedback content on the performance video or on a cheering message window linked to the performance video based on the user input information.

5. The method of claim 1, wherein the receiving a performance video and a cheering stick control message corresponding to the performance video includes any one of obtaining at least one or more cheering stick control messages previously matched to the performance video and obtaining a cheering stick control message corresponding to the performance video from a streaming server by linking with the streaming server.

6. The method of claim 1, further including, adjusting a time synchronization of the received cheering stick control message, and the adjusting the time synchronization includes detecting a start point of a control signal included in the obtained performance video and setting a control signal transmission point after a predetermined time from the detected control signal start point.

7. The method of claim 6, further including, transmitting the cheering stick control message with the adjusted time synchronization, and the transmitting the cheering stick control message with the adjusted time synchronization includes recognizing the cheering stick control message transmitter linked to the terminal and transmitting the cheering stick control message with the adjusted time synchronization through the recognized cheering stick control message transmitter in a broadcasting way.

8. The method of claim 1, wherein the at least one or more user inputs include an input of pressing a button included in the cheering stick or an input of shaking the cheering stick.

9. A cheering stick control message transmitter comprising:

a control message receiving unit linked to a terminal that transmits a performance video for data transmission and reception;

a control message transmitting unit transmitting a cheering stick control message received from the terminal; and a controller remotely controlling light emission of a cheering stick by controlling the control message receiving unit and the control message transmitting unit, wherein the controller transmits the cheering stick control message to unspecified cheering sticks in a broadcasting way by controlling the control message transmitting unit, wherein the control message receiving unit that receives a RF signal including user input information for the cheering stick from nearby cheering sticks, wherein the control message receiving unit includes a first control message receiving unit configured to receive a control message from the terminal,

wherein the control message receiving unit further includes a second control message receiving unit configured to receive at least one or more user inputs from the cheering sticks, wherein a cheering performance is matched to the performance video in real-time, wherein the cheering performance includes a same light emission pattern as that of the cheering stick in the performance video at a particular timing of a particular song from the performance video, wherein transmission of the received cheering stick control message includes:

switching, by the control message transmitting unit, an antenna between a transmission mode for a first period and a reception mode for a second period in a time-division manner; and broadcasting, by the control message transmitting unit in the transmission mode, the cheering stick control message to the cheering stick, wherein the cheering stick control message includes command data that activates cheering preparatory data pre-stored in the cheering stick, and wherein the control message transmitting unit is further configured to receive, in the reception mode, a second RF signal including user input information for the cheering stick from the cheering stick.

10. A cheering stick control system through a cheering stick control message transmitter comprising:

at least one or more cheering sticks;

a cheering stick control message transmitter; and a terminal including at least one or more displays displaying a performance video, at least one or more memories, and at least one or more processors, wherein at least one streaming program being executed by the processor and providing a cheering stick control system is stored in the memory of the terminal, wherein the at least one streaming program links to the cheering stick control message transmitter, wherein the at least one streaming program receives the performance video and a cheering stick control message corresponding to the performance video, wherein the at least one streaming program transmits the received cheering stick control message to a cheering stick through the cheering stick control message transmitter, wherein the cheering stick control message transmitter includes a control message receiving unit that receives a RF signal including user input information for the cheering stick from nearby cheering sticks, wherein the control message receiving unit includes a first control message receiving unit configured to receive a control message from the terminal,

wherein the control message receiving unit further includes a second control message receiving unit configured to receive at least one or more user inputs from the cheering sticks, wherein a cheering performance is matched to the performance video in real-time, wherein the cheering performance includes a same light emission pattern as that of the cheering stick in the performance video at a particular timing of a particular song from the performance video, wherein transmission of the received cheering stick control message includes:

switching, by the control message transmitting unit, an antenna between a transmission mode for a first period and a reception mode for a second period in a time-division manner; and broadcasting, by the control message transmitting unit in the transmission mode, the cheering stick control message to the cheering stick, wherein the cheering stick control message includes command data that activates cheering preparatory data pre-stored in the cheering stick, and wherein the control message transmitting unit is further configured to receive, in the reception mode, a second RF signal including user input information for the cheering stick from the cheering stick.

11. The system of claim 10, wherein the streaming program detects at least one or more user inputs based on the cheering stick through the cheering stick control message transmitter and controls feedback content to be displayed on the performance video based on the detected user input.

12. The system of claim 11, wherein the at least one or more user inputs based on the cheering stick include an input of pressing a button included in the cheering stick or an input of shaking the cheering stick.

13. The system of claim 11, wherein the streaming program receives at least one or more pieces of information among a serial number of a cheering stick, artist information matched to the cheering stick, and a cheering stick image representing the shape of the cheering stick from the cheering stick through the cheering stick control message transmitter together with the user input.

14. The system of claim 11, wherein the feedback content is output based on at least one of text, image, and video from at least one or more of a cheering stick image, the number of times a button of the cheering stick is pressed, the number of times the cheering stick is shaken, and a cheering stick effect.

* * * * *